United States Patent
Garrido et al.

(10) Patent No.: US 11,012,389 B2
(45) Date of Patent: May 18, 2021

(54) MODIFYING IMAGES WITH SUPPLEMENTAL CONTENT FOR MESSAGING

(71) Applicant: Apple Inc., Cupertino, CA (US)

(72) Inventors: Christopher M. Garrido, San Jose, CA (US); Eric L. Chien, Santa Clara, CA (US); Austin W. Shyu, San Diego, CA (US); Ming Jin, Saratoga, CA (US); Yan Yang, San Jose, CA (US); Ian J. Baird, San Jose, CA (US); Joe S. Abuan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/151,239

(22) Filed: Oct. 3, 2018

(65) Prior Publication Data

US 2019/0342240 A1 Nov. 7, 2019

Related U.S. Application Data

(60) Provisional application No. 62/668,115, filed on May 7, 2018.

(51) Int. Cl.
*H04L 12/58* (2006.01)
*G06K 9/00* (2006.01)
(Continued)

(52) U.S. Cl.
CPC .......... *H04L 51/10* (2013.01); *G06F 3/04845* (2013.01); *G06K 9/00255* (2013.01); *H04L 51/046* (2013.01); *H04M 1/72439* (2021.01)

(58) Field of Classification Search
CPC ... H04L 51/10; H04L 51/046; G06F 3/04845; G06K 9/00255; H04M 1/72555
(Continued)

(56) References Cited

U.S. PATENT DOCUMENTS

| 7,227,976 B1 | 6/2007 | Jung |
| 8,099,462 B2 | 1/2012 | Sheng |

(Continued)

FOREIGN PATENT DOCUMENTS

| CN | 101018314 | 8/2007 |
| CN | 103828350 | 5/2014 |

(Continued)

OTHER PUBLICATIONS

Rachel Kaser, Your complete guide to Snapchat: Snap, filter, and roll, Oct. 8, 2017, thenextweb.com, https://thenextweb.com/apps/2017/10/08/complete-guide-snapchat-snap-filter-roll/ (Year: 2017).*

(Continued)

*Primary Examiner* — Zi Ye
(74) *Attorney, Agent, or Firm* — Morgan, Lewis & Bockius LLP

(57) ABSTRACT

The subject technology provides a messaging application in which an image can be captured and supplemented with supplemental content such as stickers, animations, etc., from within an active messaging thread. In this manner, a user participating in a messaging conversation with a remote user can add stickers, animations, and/or adaptive content to an image captured by the user, without having to locally cache/store the captured image before editing and without having to leave the messaging conversion (or the messaging application) to access an image editing application.

18 Claims, 16 Drawing Sheets

(51) Int. Cl.
*G06F 3/0484* (2013.01)
*H04M 1/72439* (2021.01)

(58) Field of Classification Search
USPC .......................................................... 709/206
See application file for complete search history.

(56) References Cited

U.S. PATENT DOCUMENTS

| | | | |
|---|---|---|---|
| 9,088,426 | B2 | 7/2015 | Vivekanandan et al. |
| 9,088,697 | B2 | 7/2015 | Vivekanandan et al. |
| 9,519,396 | B2 | 12/2016 | Goossens |
| 9,787,945 | B2 | 10/2017 | Segal et al. |
| 9,818,224 | B1 * | 11/2017 | Worley ................ H04N 13/275 |
| 10,057,731 | B2 | 8/2018 | Grossman et al. |
| 10,270,783 | B2 | 4/2019 | Van Os |
| 2004/0125423 | A1 | 7/2004 | Nishi |
| 2010/0079491 | A1 | 4/2010 | Nonaka |
| 2012/0206558 | A1 | 8/2012 | Setton |
| 2013/0235045 | A1 | 9/2013 | Corazza |
| 2014/0002578 | A1 | 1/2014 | Rosenberg |
| 2014/0075335 | A1 * | 3/2014 | Hicks ..................... G06Q 10/10 |
| | | | 715/753 |
| 2015/0365627 | A1 | 12/2015 | Deng et al. |
| 2016/0088078 | A1 * | 3/2016 | Wang .................. H04L 67/1095 |
| | | | 709/203 |
| 2017/0034237 | A1 | 2/2017 | Silver |
| 2017/0171280 | A1 | 6/2017 | Kim |
| 2017/0243403 | A1 * | 8/2017 | Daniels .................. G06T 19/20 |
| 2018/0182141 | A1 | 6/2018 | Caballero |
| 2018/0190322 | A1 | 7/2018 | Zukeman |

FOREIGN PATENT DOCUMENTS

| | | |
|---|---|---|
| EP | 2887686 | 6/2015 |
| WO | WO 2016/039835 | 3/2016 |
| WO | WO 2017/059524 | 4/2017 |

OTHER PUBLICATIONS

Josh Constine, Snapchat Acquires Looksery to Power Its Animated Lenses, Sep. 15, 2015, techcrunch.com, https://techcrunch.com/2015/09/15/snapchat-looksery/2015/09/15/snapchat-looksery/ (Year: 2015).*
Jay Yarow, SNAPCHAT: We've turned over a dozen unopened snaps to law enforcement, Oct. 14, 2013, www.businessinsider.com, https://www.businessinsider.com/snapchat-weve-turned-over-a-dozen-unopened-snaps-to-law-enforcement-2013-10 (Year: 2013).*
Elyse Betters, Facebook Messenger: Here's how to use those new Snapchat-like lenses, Dec. 17, 2016, pocket-lint.com, https://www.pocket-lint.com/apps/news/facebook/139756-facebook-messenger-here-s-how-to-use-those-new-snapchat-like-lenses (Year: 2016).*
Nick Statt, Facebook introduces new augmented reality effects for Messenger, Dec. 12, 2017, theverge.com, https://www.theverge.com/2017/12/12/16767664/facebook-messenger-world-effects-augmented-reality-developers (Year: 2017).*
Gartenberg, "How to use Snapchat in 2017," May 27, 2017, retrieved from https://www.theverge.com/2017/5/27/15667268/how-to-use-snapchat-guide-messages-snap-video-2017, 7 pages.
International Search Report and Written Opinion from PCT/US2019/022103, dated May 27, 2019, 16 pages.
International Search Report and Written Opinion from PCT/US2019/022340, dated Jun. 26, 2019, 28 pages.
Eadicicco, "You Can Now Add Stickers to Instagram Posts," Dec. 20, 2016, downlaoded from http://time.com/4607776/instagram-stickers-feature-2016/, 1 page.
"Insta Emoji Photo Editor," downloaded on Sep. 20, 2018 from https://itunes.apple.com/us/app/insta-emoji-photo-editor/id644680748?mt=8, 3 pages.
Taiwanese Office Action from Taiwanese Patent Application No. 108113738, dated Dec. 9, 2019, 29 pages including English language translation.
Written Opinion from PCT PCT/US2019/022340, dated Jul. 23, 2020, 12 pages.
International Preliminary Report on Patentability from PCT/US2019/022340, dated Sep. 9, 2020, 23 pages.
Written Opinion of the International Preliminary Examining Authority from PCT/US2019/022103, dated Aug. 27, 2020, 8 pages.

* cited by examiner

1000

PROVIDING, WITH THE MESSAGING APPLICATION, THE IMAGE AND INSTRUCTIONS FOR MODIFYING THE IMAGE WITH THE SUPPLEMENTAL CONTENT — 1002

SENDING, TO THE REMOTE DEVICE, THE IMAGE, THE INSTRUCTIONS FOR MODIFYING THE IMAGE WITH THE SUPPLEMENTAL CONTENT, AND/OR THE SUPPLEMENTAL CONTENT — 1004

*FIG. 10*

MODIFYING IMAGES WITH SUPPLEMENTAL CONTENT FOR MESSAGING

The present application claims the benefit of U.S. Provisional Patent Application Ser. No. 62/668,115, entitled "MODIFYING IMAGES WITH SUPPLEMENTAL CONTENT FOR MESSAGING," filed May 7, 2018, which is hereby incorporated herein by reference in its entirety and made part of the present U.S. Utility Patent Application for all purposes.

TECHNICAL FIELD

The present description relates generally to modifying electronic images, and more particularly to modifying images with supplemental content for messaging.

BACKGROUND

Messaging applications can provide the ability for person-to-person communication for users of electronic devices. Texts messages and images can be transmitted using messaging applications. Messaging applications for electronic devices commonly provide a keyboard interface and a message stream display in which a user of an electronic device can conduct a messaging conversation with a user of a remote device. Some messaging applications also provide an option for a user to capture an image with a device camera for sending in the messaging conversation.

BRIEF DESCRIPTION OF THE DRAWINGS

Certain features of the subject technology are set forth in the appended claims. However, for purpose of explanation, several embodiments of the subject technology are set forth in the following figures.

FIG. 10 illustrates a flow diagram of another example process for sending a message including a captured image with supplemental content in accordance with one or more implementations.

DETAILED DESCRIPTION

Figure 1:
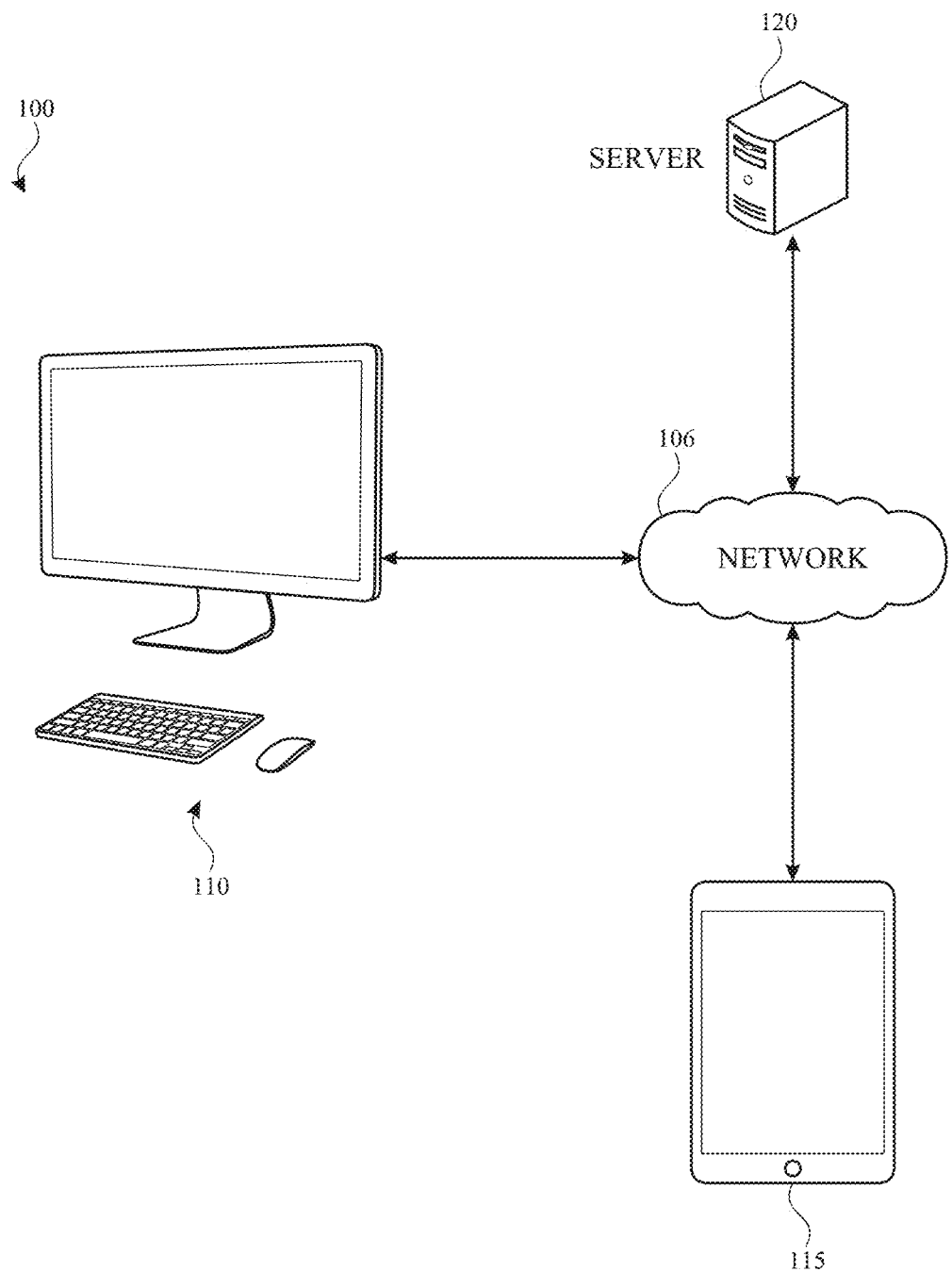
FIG. 1 illustrates an example network environment in which modifying images with supplemental content for messaging may be implemented in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Messaging applications for electronic devices allow text and media exchanges between remote electronic devices. The text and media exchanges generate a messaging stream between the devices that forms a conversation. The conversation is typically displayed in a messaging stream view or conversation view in which outgoing and incoming messages are displayed. The outgoing and incoming messages can be exchanged over cellular communications networks, wireless or wired local communications channels (e.g., Bluetooth or other direct peer-to-peer communications, or communications via a local area network), or over wide-area networks such as the Internet and leveraging mobile communications protocols.

The outgoing and incoming messages can include alphanumeric characters, images such as user-captured images or computer-generated still images (e.g., emojis or stored image content), video clips such as user-captured videos or computer generated animations (e.g., animated emojis or stored animated digital images), and/or audio clips. Some messaging applications for electronic devices include an option for a user to capture a still image or a video clip using a camera of the device, and to then send the captured still image or video clip into the messaging stream of an ongoing conversation.

However, if the user desires to edit or modify a captured image or video before sending (e.g., by adding supplemental content to the captured image or video), the user is typically required to locally store the captured image or video, exit the messaging application, open the stored captured image or video with a separate editing application, modify the captured image or video using the separate editing application, locally store the modified image or video, exit the editing application, re-open the messaging application, access the stored modified image or video, and then send the accessed stored modified image or video. This process can be time-consuming, inefficient, and disruptive to a conversation, which can discourage the use of image and video modifying features of the device during messaging, and can make the device a less effective tool for communications.

Some embodiments provide electronic devices with cameras and processing circuitry configured to run messaging applications that provide a user with the ability to add supplemental content to a captured still image, a preview image or preview stream, or a video clip from within the messaging application for direct insertion into an active messaging stream or messaging thread (e.g., without requiring local storage of the original or modified image and without exiting the messaging application or accessing any other application).

The supplemental content can include static content such as sticker icons that can be placed over a portion of the image, preview stream, or video, animated content such as animated characters that can be placed over a portion of the image, preview stream, or video, or adaptive content that can be placed over a portion of a continuous feed from a camera and that adaptively changes based on changes in the content of the continuous feed. The adaptive content can be frozen when a still image is captured from within the messaging application, or can be adaptively modified to form adaptive animated content over a video clip, the adaptive animated content moving and changing with changing content in the video clip in the same way the adaptive content moved and changed based on the content during recording of the video clip.

Thus, some embodiments allow users to more efficiently and effectively participate in messaging conversations, e.g., as compared to devices with existing messaging applications described above.

FIG. 1 illustrates an example network environment 100 in which modifying images with supplemental content for messaging may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, an electronic device 115, and a server 120. The network 106 may communicatively (directly or indirectly) couple the electronic device 110 and/or the server 120, the electronic device 115 and/or the server 120, and/or electronic device 110 and/or the electronic device 115. In one or more implementations, the network 106 may be an inter-connected network of devices that may include, or may be communicatively coupled to, the Internet. For explanatory purposes, the network environment 100 is illustrated in FIG. 1 as including an electronic device 110, an electronic device 115, and a server 120; however, the network environment 100 may include any number of electronic devices and any number of servers.

The electronic device 110 may be, for example, desktop computer, a portable computing device such as a laptop computer, a smartphone, a peripheral device (e.g., a digital camera, headphones), a tablet device, standalone messaging hardware, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 110 is depicted as a desktop computer. The electronic device 110 may be, and/or may include all or part of the electronic system discussed below with respect to FIG. 16. In one or more implementations, the electronic device 110 may include a camera and may provide a messaging application for exchanging messages with modified images over the network 106 with electronic device 115.

The electronic device 115 may include a touchscreen and may be, for example, a portable computing device such as a laptop computer that includes a touchscreen, a smartphone that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 115 may not include a touchscreen but may support touchscreen-like gestures, such as in a virtual reality or augmented reality environment. In FIG. 1, by way of example, the electronic device 115 is depicted as a tablet device with a touchscreen. In one or more implementations, the electronic device 115 may be, and/or may include all or part of, the electronic device discussed below with respect to the electronic system discussed below with respect to FIG. 16. In one or more implementations, the electronic device 115 may also include a camera and may provide a messaging application for exchanging messages with modified images over the network 106 to with electronic device 110.

In one or more implementations, the server 120 manages secure exchange of messages between electronic devices 110 and 115. In one or more implementations, the server 120 may store content for inclusion in the messages. For example, the server may store animated images that can be downloaded to electronic device 110 or electronic device 115 and included in (or as) a message to the other of electronic device 110 or 115. As another example, the server may store supplemental content that can be added to a user-captured image or continuous feed of images before or after the user-captured image is sent in (or as) a message. However, it should be appreciated that supplemental content for modifying user-captured images or continuous feeds may be stored locally by electronic device 110 and/or electronic device 115 for modification of the image prior to sending or after receipt (e.g., based on metadata including instructions for modifying the image and/or rendering the modified image).

Figure 2:
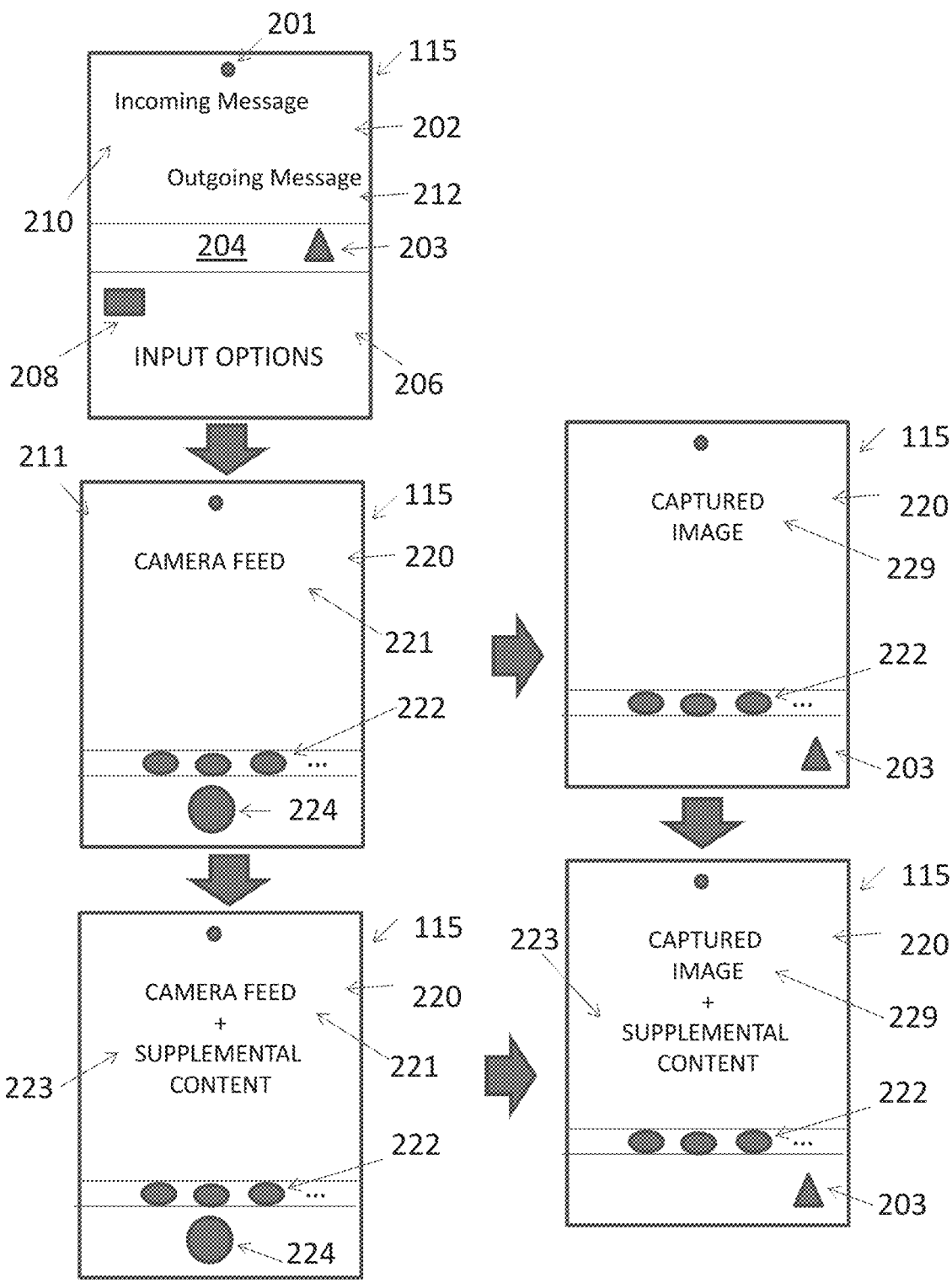
FIG. 2 illustrates a schematic diagram showing exemplary user interface views of a sending device during modifying images with supplemental content for messaging in accordance with one or more implementations.

An example of modifying images with supplemental content for messaging is illustrated in FIG. 2. An example process for modifying images with supplemental content for messaging is discussed further below with respect to FIG. 8. Example processes for sending an image modified with supplemental content are discussed further below with respect to FIGS. 9 and 10. An example process for receiving and displaying a message including an image modified with supplemental content is discussed further below with respect to FIG. 11.

FIG. 2 illustrates various user interface views of electronic device 115 during operation of a messaging application. As shown in FIG. 2, the messaging application can include a message stream view 202, an input display 206 including input options such as an alphanumeric keyboard, and a send option 203 for sending messages being composed in an input field 204. The input display 206 may include options for including content other than alphanumeric content in input field 204 for sending in or as a message. For example the input display 206 may include selectable options for including emojis, stored images, or cloud-based animated images in a message. Alphanumeric text (when entered) and/or the emojis, stored images, or cloud-based animated images (when selected) appear in the input field 204 until the send option 203 is selected. It should be noted that the alphanumeric text and the emojis, stored images, or cloud-based animated images are generally not editable when displayed in the input field 204. As shown, outgoing messages 212 that have been sent using send option 203 are displayed in the message stream view 202 (e.g., interleaved in a message stream with incoming messages 210). Outgoing messages 212 may be provided to one or more remote users (e.g., directly to one or more remote devices or to one or more remote devices via a messaging server such as server 120). Incoming messages 210 may be received from one or more remote devices and may be displayed in a common message stream view 202 (e.g., for group messaging sessions) or in separate message stream views for each remote device).

As shown in FIG. 2, the input display also includes a camera mode option 208 (e.g., a camera mode option) for capturing an image using camera 201 (e.g., a front-facing camera on the same side of electronic device 115 as the display or a rear-facing camera (not explicitly shown)). When camera mode option 208 in the messaging application is selected, the messaging application provides (e.g., in place of some or all of message stream view 202 and/or input display 206) a real-time image preview 220. The real-time image preview 220 displays a camera feed 221. Camera feed 221 may be continuous feed of a live series of image frames obtained by camera 201, displayed as they are obtained, to provide a real-time preview of the image that would be captured by camera 201 if an image capture option 224 is selected.

As shown in FIG. 2, when camera mode option 208 in the messaging application is selected, the messaging application also displays one or more supplemental content options 222 that, when selected (e.g., by a touch, button, audio, or other selection mechanism), cause a processor of electronic device 115 to combine corresponding supplemental content 223 (e.g., supplemental content corresponding to that selected supplemental content option 222) with an image displayed in the real-time image preview, the image having been obtained by the camera.

As shown in the example of FIG. 2, the image obtained by the camera may be a frame of the camera feed 221 that is combined with the supplemental content, or may be a still or captured image 229 that has been captured responsive to selection of image capture option 224.

Supplemental content options 222 can be provided together with the camera feed 221 from the camera. A selection of a supplemental content option 222 while the camera feed 221 is displayed causes the processor of electronic device 115 to add the supplemental content 223 to the camera feed 221 from the camera.

Supplemental content 223 may be static supplemental content that is displayed over the continuous feed from the camera, animated supplemental content that is displayed over the continuous feed from the camera, or adaptive supplemental content that is displayed over the continuous feed from the camera.

Static supplemental contact may include digital stickers, word art, user-drawn content (e.g., content drawn using an input to a touch screen of the device with the user's finger or a stylus device) or other static content that can overlay or replace a portion of the displayed camera feed. The static supplemental content, when displayed with the camera feed, can be moved, resized, rotated, or otherwise edited while the continuous feed is displayed. If desired, to reduce the size of the modified image to be sent in a message, the portion of the image that would be covered by the static content can be zeroed or otherwise reduced in size so that a reduced size image (e.g., with the covered portion zeroed, compressed, or removed from the transmission) can be transmitted.

Animated supplemental content may include previously stored animations such as animated digital images, downloaded or cloud-accessible animations, or user-generated animations that have been previously stored by electronic device 115 or server 120. The animated supplemental content, when displayed with the camera feed, can be moved, resized, rotated, or otherwise edited while the continuous feed is displayed. Although the animated static content may change over time, the changes in the animated content are independent of changes in the content of the camera feed.

In contrast, adaptive supplemental content that is added to the continuous feed may change (e.g., may be modified by the processor of electronic device 115) based on content in the continuous feed from the camera. For example, the adaptive supplemental content may include facial modification content for modifying a face in the images of the continuous feed. When a supplemental content option 222 for facial modification content is selected from within the camera mode display of the messaging application, the processor of the device may detect a face in the continuous feed from the camera, apply the facial modification content to the detected face, and actively modify the facial modification content based on changes to the detected face (e.g., as detected in the continuous feed images by the processor).

For example, facial modification content may include one or more features of an animal head or an entire head of an animal (e.g., a fox, an elephant, a dog, or mouse) that replaces or overlays the face of a user in the continuous feed and that includes facial expressions that track, enhance, exaggerate, or otherwise respond to the facial expressions of the user's face in the continuous feed. The facial modification content may also change in size, position, and/or orientation in coordination with the size, position, and/or orientation of the user's head in the continuous feed (e.g., due to changes in the position and/or orientation of the user's head and/or changes in the distance between the user's head and the device).

When image capture option 224 is selected while the adaptive supplemental content 223 is displayed with the camera teed 221, the adaptive supplemental content 223 that is displayed at the time of the selection is stored as static supplemental content for the image that is captured at that time. Following image capture option 224 being selected, a still captured image with the adaptive supplemental content 223 that was displayed at the time of the selection is displayed in real-time image preview 220, along with a send option 203 to send the displayed static image modified with the supplemental content. In other words, the processor of electronic device 115 may receive, at a time, a selection of image capture option 224 while displaying the supplemental content 223 and the camera feed 221 from the camera, operate the camera to capture a still image responsive to the selection of the image capture option 224; and display the captured image 229 with the supplemental content 223 as displayed at the time of the selection of the image capture option 224. The send option 203 to send the captured image modified with the supplemental content may cause the processor of electronic device 115 to send, via an active messaging thread (e.g., the message thread shown in message stream view 202) in the messaging application, the image combined with the corresponding supplemental content to one or more remote devices such as electronic device 110. Various options for sending the displayed static image modified with the supplemental content are described hereinafter in connection with, for example, FIGS. 4, 5, 9 and 10.

Figure 6:
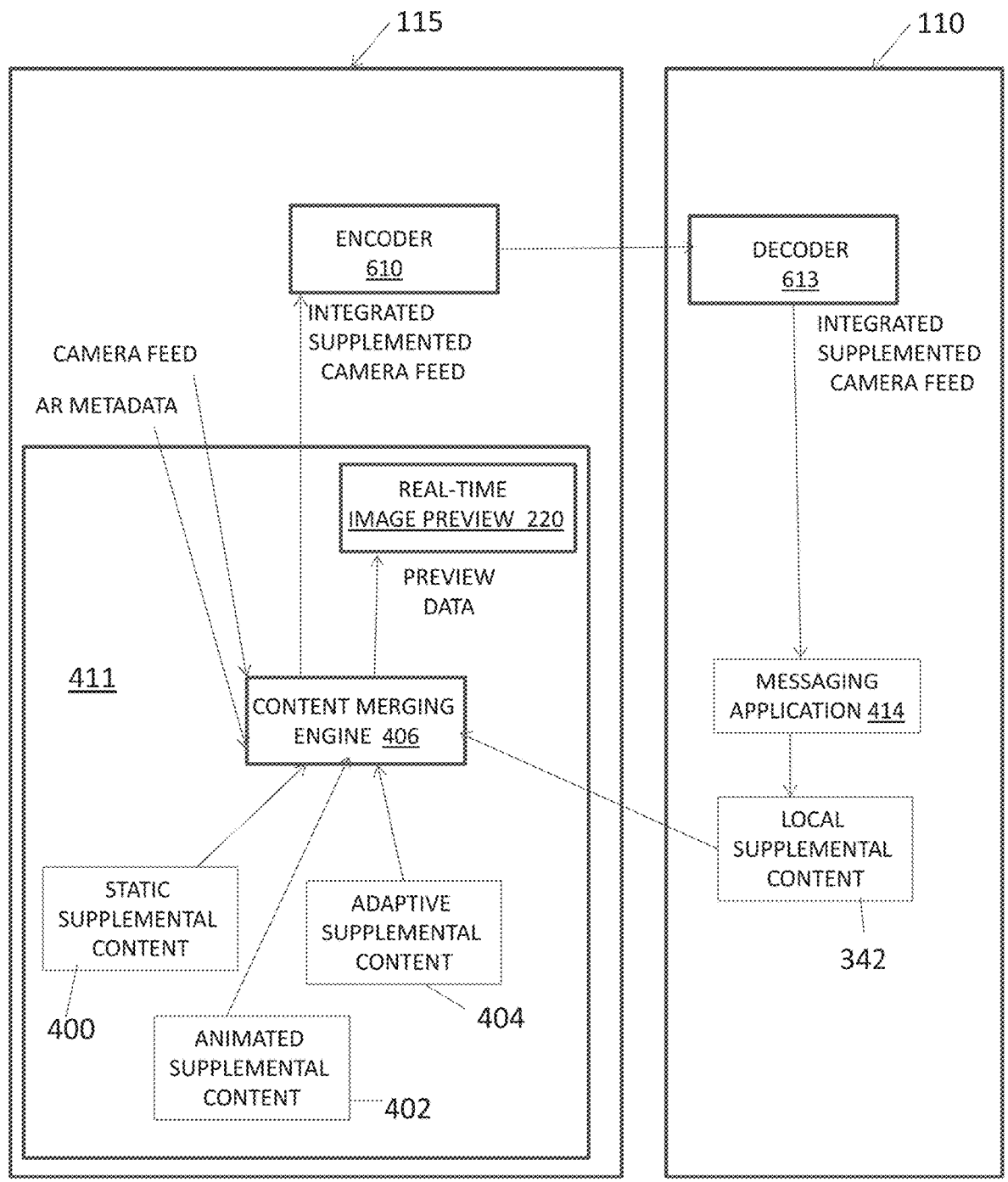
FIG. 6 illustrates a schematic diagram showing an exemplary data flow for integration of supplemental content with a camera feed for transmission in accordance with one or more implementations.
Figure 7:
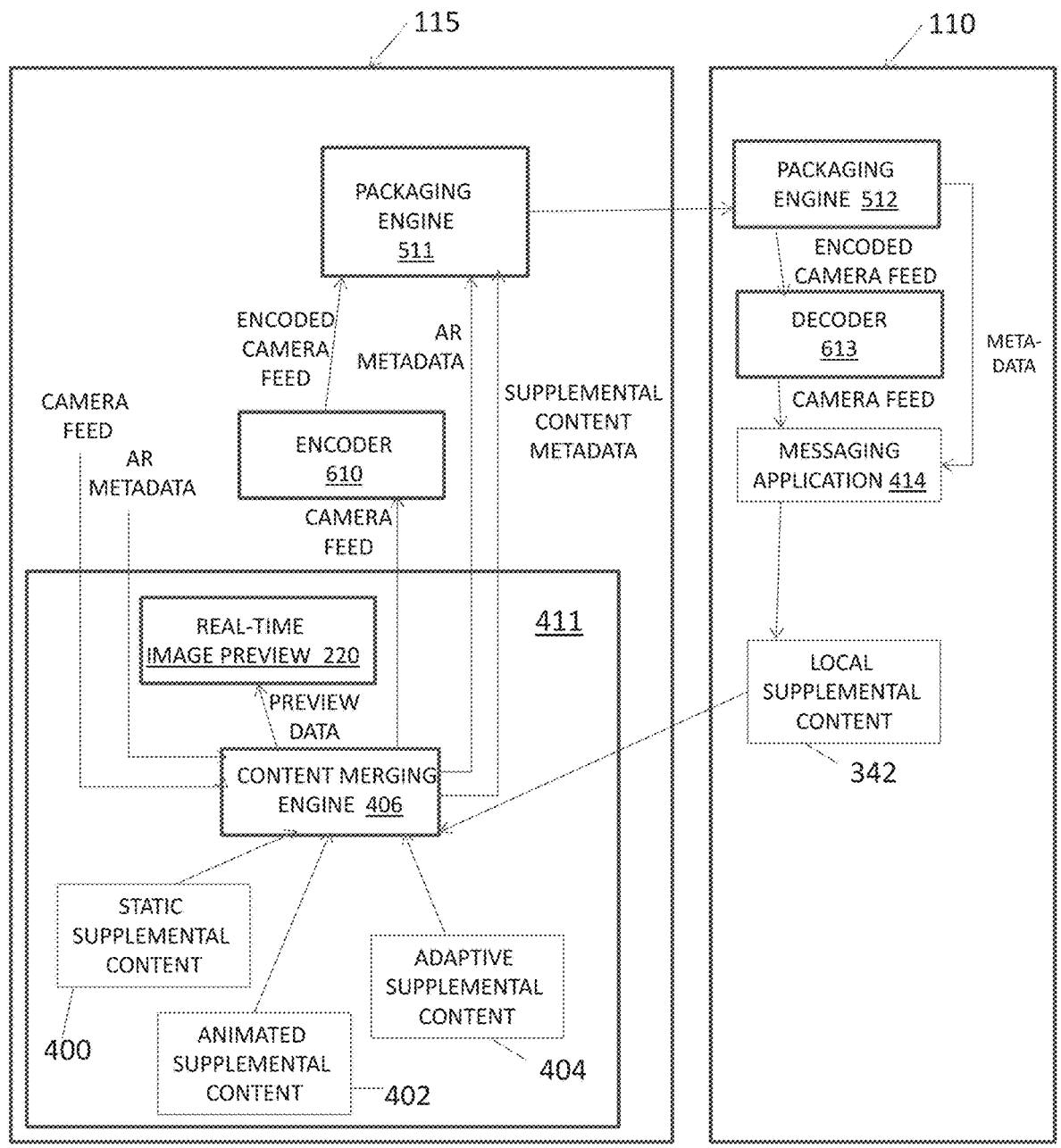
FIG. 7 illustrates a schematic diagram showing an exemplary data flow for packaging of supplemental content metadata to accompany a camera feed for transmission in accordance with one or more implementations.

However, it should be noted that, in some scenarios, even before the image capture option 224 is selected, the camera feed 221 and the static, animated, and/or adaptive supplemental content may be transmitted and displayed, in real time, in the message feed of the messaging application of the remote device. The sending operations described in connection with FIGS. 9 and 10, although generally described in the context of a still image may be repeatedly applied (e.g., image frame by image frame) to send a continuous camera feed with supplemental content. FIGS. 6 and 7 illustrate various specific data flows that may be involved in sending a continuous camera feed with supplemental content.

As shown in FIG. 2, in some scenarios, the image capture option 224 may be selected before any of the supplemental content options 222 are selected. In this scenario, the processor of electronic device 115 may, responsive to a selection of image capture option 224, capture a still image using the camera and provide the supplemental content options 222 together with the captured image 229 (e.g., the still image) in the real-time image preview 220. Responsive to a selection of one of supplemental content options 222 while captured image 229 is displayed, the processor may display static supplemental content, animated supplemental content, or adaptive supplemental content over or in cooperation with the captured image.

As with the supplemental content displayed over the continuous feed, static or animated supplemental content may be moved, rotated, resized, or otherwise edited by the user before sending the modified still image. In this scenario, the adaptive supplemental content may be static once the processor has generated the adaptive supplemental content based on the content (e.g., the size, position, orientation, and/or expression of one or more faces) detected in captured image 229. It should also be noted that, although a single captured image 229 is depicted, supplemental content options 222 can also apply to supplemental content to a captured video clip that has been captured responsive to operation of image capture option 224 (e.g., by cycling through image frames of the video clip, one or more of which are modified with supplemental content such as static supplemental content, animated content that is independent of the image/video content, or adaptive supplemental content that changes responsive to content changes among the image frames of the video clip).

It should also be appreciated that, in some scenarios, the supplemental content that is exchanged with the images via the active messaging thread can be editable by the receiving device (e.g., if the received image is not integrated with the supplemental content by direct modification of the image pixel values at the sending device, such as by merging the layers of the image and the supplemental content, and is instead rendered with supplemental content at the receiving device).

Figure 3:
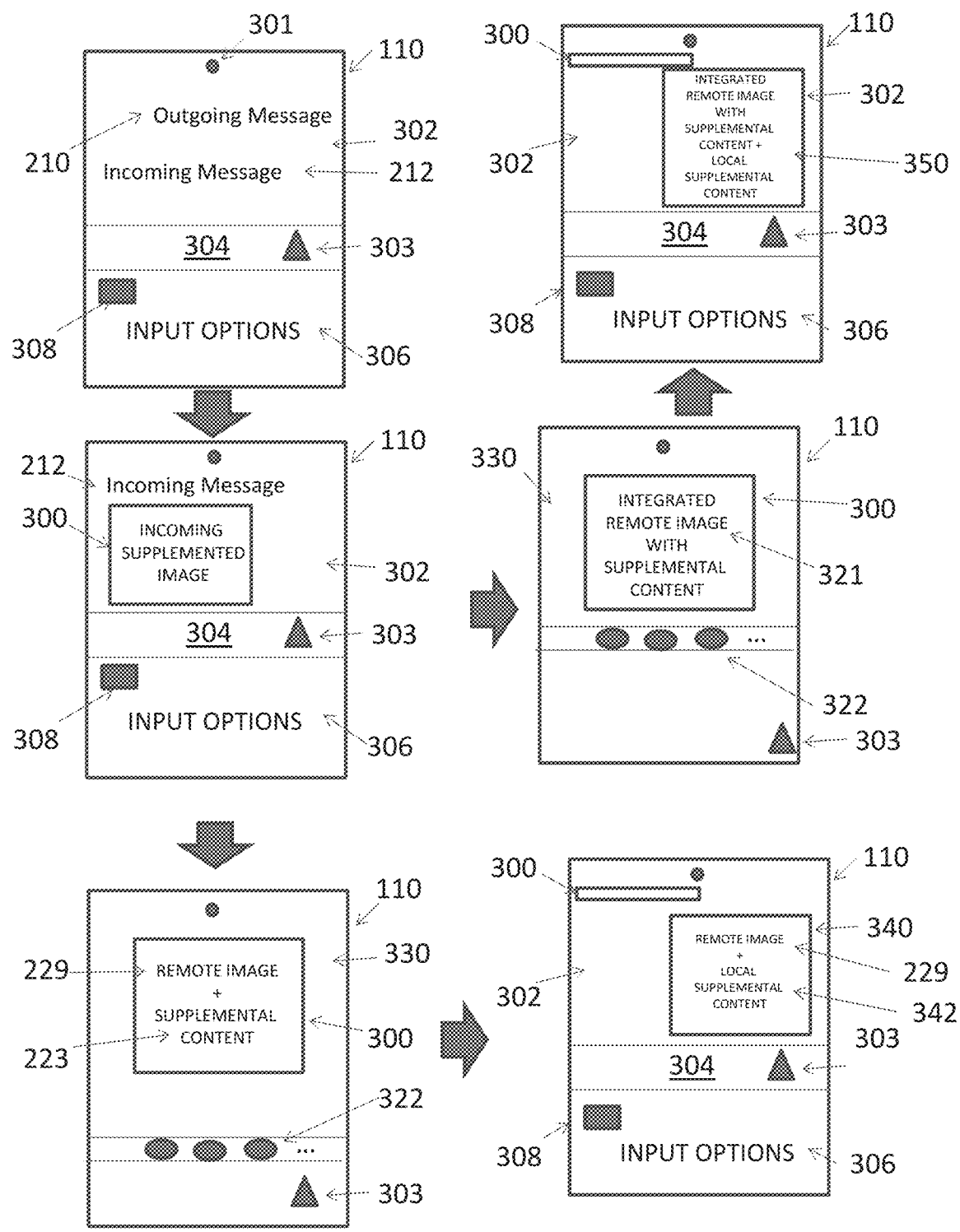
FIG. 3 illustrates a schematic diagram showing exemplary user interface views of a receiving device for receipt of images with supplemental content for messaging in accordance with one or more implementations.

FIG. 3 shows various exemplary user interface views during receipt and further editing of images and supplemental content. In the example of FIG. 3, the processor of electronic device 110 receives (after previously receiving an incoming message 212 from the electronic device 115 and sending outgoing message 210 to electronic device 115 and displaying the incoming and outgoing messages in a message stream view 302 of a messaging application of electronic device 110) an incoming supplemented image 300 from electronic device 115.

The incoming supplemented image 300 may be a still image including supplemental content from electronic device 115 or may be a supplemented continuous feed from electronic device 115. In scenarios in which incoming supplemented image 300 is a supplemented continuous feed from electronic device 115, the supplemented continuous feed may be displayed as a preview stream in the message stream view 302 of electronic device 110 in which other previous messages such as incoming message 212 and outgoing message 210 are displayed. Whether incoming supplemented image 300 is a still image or a continuous feed, the supplemental content associated therewith may be integrated into the incoming supplemented image 300 (e.g., integrated into the received pixel values) or may be obtained by electronic device 110 and rendered by electronic device 110. Integrating the supplemental content with an image or a camera feed allows the described supplemental content functionality to be backward compatible with remote devices that do not have the functionality for rendering a supplemented image or camera feed (e.g., due to software that has not yet been updated or software on an older device), and also allows the described supplemental content functionality to be compatible with third party software and/or devices for which the sending device cannot determine whether the remote device has the described supplemental content functionality. In some cases, the user of electronic device 115 may be provided with the ability to choose whether to provide integrated or non-integrated supplemental content with a captured image or a camera feed. In some cases, electronic device 115 may automatically determine whether to provide the integrated or non-integrated supplemental content with a captured image or a camera feed (e.g., based on the available transmission bandwidth, the available functionality of the receiving device, or the lack of information about the functionality of the receiving device). In some scenarios, a messaging application of electronic device 115 may perform pre-messaging (e.g., handshake) operations with a remote device to determine whether the remote device is capable of rendering supplemental content with a received captured image or camera feed and/or whether the supplemental content is available at the remote device or should be provided to the remote device in the message.

In scenarios in which the supplemental content of incoming supplemented image 300 is received separately for rendering by the processor of electronic device 110 (e.g., in metadata of the incoming supplemented image 300 or following instructions in the metadata to obtain the further supplemental content from local storage of electronic device 110 or from server 120), the processor of electronic device 110 may obtain the supplemental content from local storage or cloud-based storage, based on the metadata and may display, in message stream view 302, the captured image 229 or the camera feed and the supplemental content 223.

As illustrated in FIG. 3, in scenarios in which incoming supplemented image 300 is a still image including supplemental content from electronic device 115, incoming supplemented image 300 may be an integrated incoming image 321 in which the supplemental content 223 was added to captured image 229 at electronic device 115 by directly modifying the pixel values of the captured image, or incoming supplemented image 300 may include both the captured image 229 and the supplemental content 223, rendered together in the message stream view 302 by electronic device 110.

Electronic device 110 may then be used to add further supplemental content such as local supplemental content 342 to either the integrated incoming image 321 or to the original captured image 229 (e.g., with or without removing supplemental content 223 that was added by electronic device 115). For example, when the user of electronic device 110 selects (e.g., by tapping or pressing) the incoming supplemented image displayed in message stream view 302, an editing view 330 for further editing the incoming supplemented image 300 may be provided, the editing view including supplemental content options 322 that, when selected, add local supplemental content to the incoming supplemented image 300.

In the example of FIG. 3, one scenario is illustrated in which the editing view 330 is used to add local supplemental content to the integrated incoming image 321 that includes the supplemental content 223 that was added at electronic device 115 (e.g., by selecting one of supplemental content options 322). For example, the messaging application of electronic device 110 may add static or animated supplemental content to integrated incoming image 321 and/or may perform image analysis operations to detect image features to be used when adding adaptive supplemental content to integrated incoming image 321. As shown, an outgoing image 350 that includes the integrated removed image with supplemental content and the added local supplemental content can be sent (e.g., by selection of send option 303) and displayed in message stream view 302 of the messaging application.

FIG. 3 also illustrates another scenario in which the editing view 330 is used to remove supplemental content 223 from captured image 229 and replace supplemental content 223 with local supplemental content 342. The supplemental content 223 from electronic device 115 may be removed using supplemental content metadata that was provided with incoming supplemented image 300 and that describes the location and content of supplemental content 223. Local supplemental content 342 may be added to captured image 229 using, for example, AR metadata (e.g., depth or other physical object characteristic information) received with incoming supplemented image 300, responsive to a selection of one of supplemental content options 322. As shown, an outgoing image 340 that includes the captured image 229 from electronic device 115 and the added local supplemental content 342 from electronic device 110 can be sent (e.g., by selection of send option 303) and displayed in message stream view 302 of the messaging application.

As with the supplemental content 223 that was included in incoming supplemented image 300, the local supplemental content may be integrated into outgoing image 340 or outgoing image 350, or provided separately for rendering by the processor of electronic device 115. A camera mode option 308 may also be displayed by electronic device 110 so that the user of electronic device 110 can capture and/or modify an image from camera 301 for sending in a message (e.g., by selection of send option 303, which can also be used to send text or emojis in field 304 as selected from input options 306).

Figure 4:
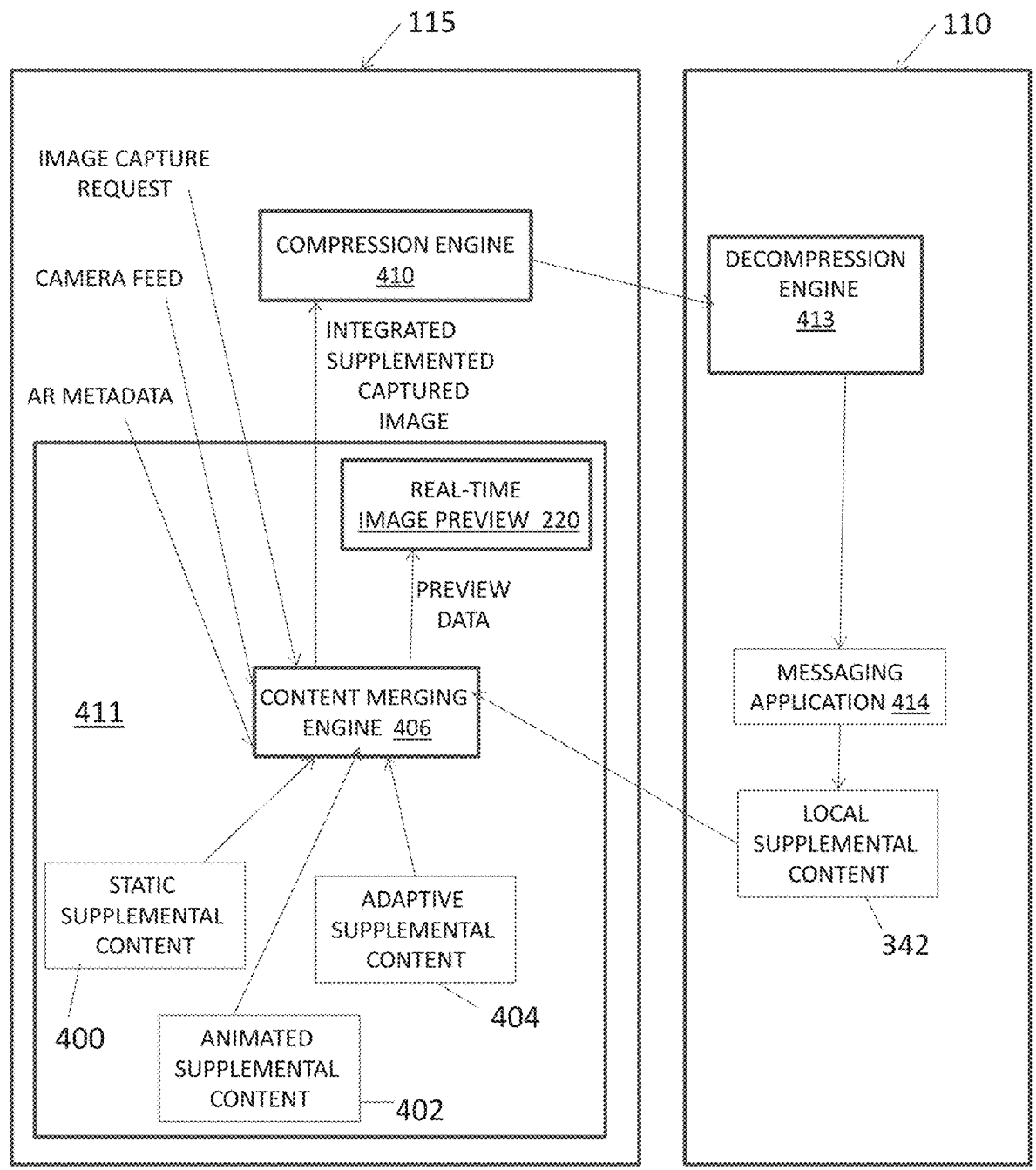
FIG. 4 illustrates a schematic diagram showing an exemplary data flow for integration of supplemental content with a captured image for transmission in a message in accordance with one or more implementations.

FIG. 4 illustrates various data flow aspects of an example in which electronic device 115 generates an integrated supplemented captured image for sending in an active messaging thread. As shown in the example of FIG. 4, electronic device 115 may include a content merging engine 406 (e.g., a hardware component or a content-merging portion of a messaging application 411) that receives a camera feed such as camera feed 221, including a series of preview image frames from the camera. Content merging engine 406 may also receive supplemental content 223 such as static supplemental content 400, animated supplemental content 402, and/or adaptive supplemental content 404 as selected by the user of the device.

Separate augmented-reality metadata may also be provided to the content merging engine if desired. Augmented-reality (AR) metadata may include information that describes physical objects such as people, facial features, animals, trees, bushes, flowers, streets, street signs, furniture or other physical objects that are represented in the preview image frames or in a captured image. For example the AR metadata may include depth information, size information, pixel location information, motion information, orientation information or other information about the physical objects (e.g., as determined by one or more image sensors of a camera such as camera 201 or 301 and/or one or more other sensors). Content merging engine 406 may use the AR metadata to position, orient, size, and/or adapt the supplemental content that is added to the camera feed 221 or to a captured image 229 from the camera. For example, if adaptive supplemental content including an animated animal face is selected to overlay an image of a user's face as captured by a front-facing camera on the user's smartphone, the AR metadata may indicate the boundaries, location, size, depth, and features (e.g., the locations of the eyes, ears, mouth, etc.) of the user's face, which can be used to size, locate, orient, and determine the facial expression of the animated animal face, as well as to animate the animated animal face to correspond to changes in the depth at which the user's face is imaged, the orientation or location of the imaged face, and/or the facial expression of the user in the captured image.

In the example of FIG. 4, content merging engine 406 receives an image capture request (e.g., responsive to a selection of image capture option 224 of messaging application 411) that instructs the content merging engine 406 to add the supplemental content that is being displayed over the camera feed at the time of the image capture request to the still image (e.g., the current image frame) that is displayed at that time. Alternatively, content merging engine 406 may receive a captured image that has already been captured from within the messaging application 411 (rather than receiving the image capture option), along with AR metadata for that captured image and the selected supplemental content for that captured image.

In the example of FIG. 4, the captured image 229 is modified by the addition of static supplemental content 400, animated supplemental content 402, and/or adaptive supplemental content 404 by adding supplemental content values to some or all of the pixel values of the captured image and/or replacing some or all of the pixel values of the captured image with supplemental content values. In this way, the supplemental content is integrated in the pixel values of the captured image themselves to form an integrated supplemented captured image, without storing information about the modification. The integrated supplemented captured image may be provided from content merging engine 406 to a compression engine 410 of electronic device 115 for transmission (e.g., via communications circuitry of electronic device 115 and/or network interfaces of the device and via network 106) to a decompression engine 413 of the remote device (e.g., electronic device 110). In this example, the integrated supplemented captured image is sent without any supplemental content metadata that describes the supplemental content as separate from the captured image from the camera and without AR metadata such as depth information.

The decompression engine 413 at the remote device may decompress the compressed integrated captured image for display at the remote device (e.g., within a messaging application 414 running on the remote device). Because the supplemented captured image was integrated prior to sending, the remote device displays the received integrated captured image without modification at the remote device. It should be appreciated that the integrated image can be transmitted without compression and/or can be otherwise modified for transmission such as by encoding of the integrated image.

In these integrated transmission scenarios, local supplemental content 342 can be added to the integrated supplemented captured image by messaging application 414 at the receiving device, or at the sending device (e.g., if instructions for adding the remote supplemental content are provided from the receiving device to the sending device). However, the remote device may perform image analysis operations to detect physical objects and/or supplemental content in the captured image for the addition of the local supplemental content (e.g., because the integrated supplemented captured image does not include this information) and the supplemental content previously added at the sending device cannot be modified or removed at the receiving device to obtain the original image frames. The local supplemental content 342 may be provided (e.g., via network 106 and/or server 120) to electronic device 115 (e.g., to the content merging engine 406) for inclusion in the preview stream at that device or for sending to other remote devices. If desired, at the sending device, preview data is provided to real-time image preview 220 such that the supplemental content may be displayed with the camera feed 221 or captured image 229 in an editable form (e.g., the preview data may include the camera image frames and the supplemental content separately) to allow modifications to the supplemental content at the sending device. In the example of FIG. 4, real-time image preview 220 is shown as a part of messaging application 411, however it should be appreciated that messaging application 411 generates the real-time image preview content for display on a display of the electronic device 115.

As noted above, in some scenarios, it may be desirable to provide a modified captured image having supplemental content by adding supplemental content metadata to an unmodified captured image from a camera, the metadata including instructions to modify the captured image with the supplemental content at the receiving device. In this way, a receiving user can be provided with the ability to identify modifications that have been made, undo the modifications and/or further modify the captured image with the receiving device (e.g., as described in connection with FIG. 3). For example, if the sending user added a fox head to a captured image of the sending user, when the modified image of the sending user is displayed with the added fox head, the receiving user can modify the fox head by adding a hat or sunglasses or changing other features of the fox head, or the receiving user can undo the modification by selecting the fox head and removing the fox head from the image of the sending user. The receiving user can then add an elephant head to the captured image of the sending user and send the further modified image of the sending user back to the sending user in a new message or send instructions to the sending user's device to implement the further modifications at the sending device (e.g., in a real-time image preview being displayed at the sending user's device). In this way, the amount of data to be transferred can also be reduced (e.g., if the supplemental content is stored on both devices and rendered at the receiving device, using the supplemental content stored at that device based on instructions received in metadata with the unmodified captured image).

Accordingly, in some scenarios, modifying the captured image and transmitting the modified captured image may include sending the captured image, the supplemental content, and instructions for rendering the captured image and the supplemental content to the remote device. In some scenarios modifying the captured image and transmitting the modified captured image may include sending the captured image and instructions for obtaining and rendering the supplemental content to the remote device.

Figure 5:
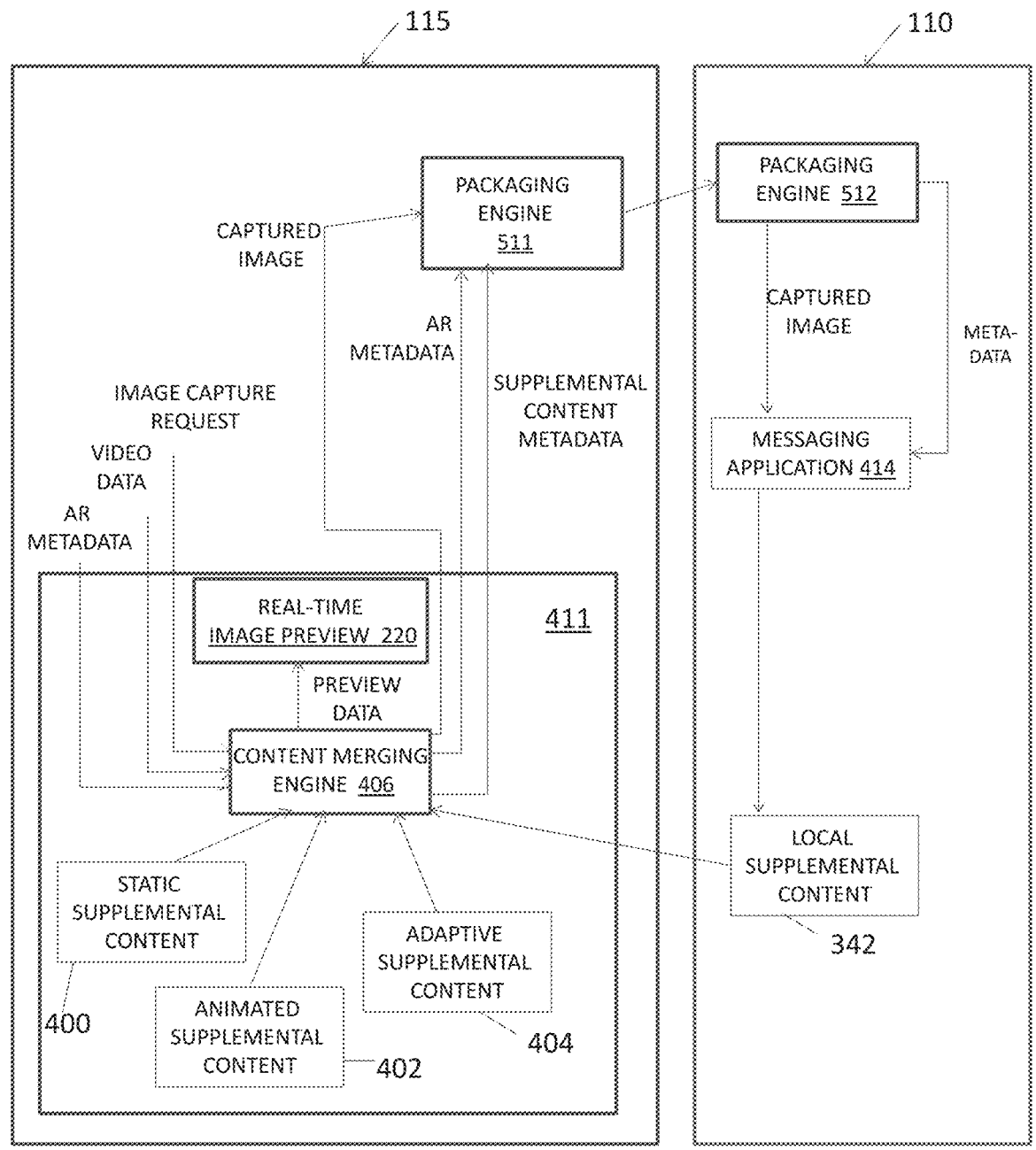
FIG. 5 illustrates a schematic diagram showing an exemplary data flow for packaging of supplemental content metadata to accompany a captured image for transmission in a message in accordance with one or more implementations.

For example, as shown in FIG. 5, when the content merging engine 406 of the messaging application 411 of the sending electronic device (e.g., electronic device 115) receives or captures captured image 229 and receives static supplemental content 400, animated supplemental content 402, and/or adaptive supplemental content 404 as selected by the user of the device, instead of integrating the supplemental content into the pixel values of the captured image 229 and providing the modified pixel values to compression engine 410 for compression and transmission, the content merging engine 406 may send captured image 229 (or a compressed or encoded version thereof) separately from supplemental content metadata and/or AR metadata to a packaging engine 511 (e.g., a transport protocol engine such as a real-time transport protocol (RTP) engine) of the device.

As shown in FIG. 5, the packaging engine 511 may receive captured image 229 and package the captured image 229, the supplemental content metadata, and/or the AR metadata for transmission to packaging (e.g., a transport protocol such as RTP) engine 512 at the remote device (e.g., via network 106). The packaging engine 512 separates (unpacks) the supplemental content metadata and/or the AR metadata from the captured image 229, provides the supplemental content metadata and/or the AR metadata to the messaging application 414, and provides the captured image 229 to the messaging application 414 (e.g., via a decompression engine or decoder).

When the messaging application 414 receives the supplemental content metadata, the AR metadata, and the captured image 229, the messaging application 414 modifies the incoming captured image 229 based on the supplemental content metadata, for display of incoming supplemented image 300 in the message stream view 302 of the remote messaging application of the remote device. For example, the messaging application 414 of the remote device may obtain the supplemental content from the supplemental content metadata itself, or from local storage at the remote device or cloud-based storage based on instructions in the supplemental content metadata. The messaging application 414 may then modify captured image 229 by addition of the obtained supplemental content 223 (e.g., by adding supplemental content values to some or all of the pixel values of the captured image 229 and/or replacing some or all of the pixel values of the captured image 229 with supplemental content values) for display.

In these non-integrated transmission scenarios, the supplemental content from the sending device can be modified or removed from the incoming supplemented image 300 at the remote device and/or additional local supplemental content 342 can be added to the supplemented captured image 229 at the receiving device (see, e.g., FIG. 3).

The examples described above in connection with FIGS. 2-5 illustrate a messaging conversation between two devices. However, it should be appreciated that images modified with supplemental content can be provided for group messaging between more than two devices.

Moreover, as described herein, in some scenarios, the real-time image preview that is displayed by electronic device 115 while the user of electronic device 115 adds or edits supplemental content for the camera feed may be transmitted, in real time, to one or more remote devices for active viewing of the modified camera feed at the remote device. A modified camera feed can be provided as an integrated supplemented camera feed in which the pixel values of the image frames of the camera feed are modified with supplemental content for transmission, or the camera feed and the supplemental content for the camera feed can be provided separately.

FIG. 6 shows an example in which the messaging application of electronic device 115 generates an integrated modified camera feed for transmission. As shown in the example of FIG. 6, content merging engine 406 receives a camera feed including a series of image frames from the camera 201. Content merging engine 406 may also receive supplemental content 223 such as static supplemental content 400, animated supplemental content 402, and/or adaptive supplemental content 404 as selected by the user of the device.

Separate augmented-reality metadata may also be provided to the content merging engine if desired. Augmented-reality (AR) metadata may include information that describes physical objects as described herein in the image frames of the camera feed. Content merging engine 406 may use the AR metadata to position, orient, size, and/or adapt, over time, the supplemental content that is added to the camera feed from the camera. For example, if adaptive supplemental content including an animated animal face is selected to overlay a representation of a user's face as captured in a camera feed by a front-facing camera on the user's smartphone, the AR metadata may indicate the boundaries, location, size, depth, and features (e.g., the locations of the eyes, ears, mouth, etc.) of the user's face in each of the image frames of the camera feed, which can be used to size, locate, orient, and determine the facial expression of the animated animal face, as well as to animate the animated animal face to correspond to changes in the depth at which the user's face is imaged, the orientation or location of the imaged face, and/or the facial expression of the user in the camera feed.

In the example of FIG. 6, image frames of the camera feed from the camera are modified by the addition of static supplemental content 400, animated supplemental content 402, and/or adaptive supplemental content 404 by adding supplemental content values to some or all of the pixel values of the image frames and/or replacing some or all of the pixel values of the image frames with supplemental content values. In this way, the supplemental content is integrated into the pixel values of the image frames themselves to form an integrated supplemented camera feed, without storing information about the modification. The integrated supplemented camera feed may be provided from content merging engine 406 to encoder 610 of electronic device 115 for transmission (e.g., via communications circuitry and/or network interfaces of the device and via network 106) to a decoder 613 of the remote device (e.g., electronic device 110). In this example, the integrated supplemented camera feed is sent without any supplemental content metadata that describes the supplemental content as separate from the camera feed from the camera and without AR metadata such as depth information.

The decoder 613 may decode the encoded integrated supplemented camera feed for display by remote messaging application 414 at the remote device (e.g., within a message stream view 302 of an active messaging thread). Because the supplemented camera feed was integrated prior to sending, the remote device displays the received integrated supplemented camera feed without modification at the remote device.

In these integrated transmission scenarios, the remote device can add local supplemental content 342 to the integrated supplemented camera feed by a messaging application 414 at the receiving device, or the remote content can be added at the sending device (e.g., if instructions for adding the remote supplemental content are provided from the receiving device to the sending device). However, the remote device may perform image analysis operations to detect physical objects and/or supplemental content in the image frames for the addition of the remote supplemental content (e.g., because the integrated supplemented camera feed does not include this information) and the supplemental content previously added at the sending device cannot be modified or removed at the receiving device to obtain the original image frames of the camera feed. The local supplemental content 342 may be provided (e.g., via network 106 and/or server 120) to electronic device 115 (e.g., to the content merging engine 406) for inclusion in the real-time image preview 220 at that device or for sending to other remote devices. If desired, at the sending device, preview data is provided to real-time image preview 220 such that the supplemental content may be displayed with the outgoing camera feed in an editable form (e.g., the preview data may include the camera image frames and the supplemental content separately) to allow modifications to the supplemental content at the sending device.

As noted above, in some scenarios, it may be desirable to provide a modified camera feed having supplemental content by adding metadata for the supplemental content to unmodified camera feed image frames from a camera, the metadata including instructions to modify the camera feed with the supplemental content at the receiving device. In this way, a receiving user can be provided with the ability to identify modifications that have been made, undo the modifications and/or further modify the camera feed with the receiving device. In this way, the amount of data to be transferred can also be reduced (e.g., if the supplemental content is stored on both devices and rendered at the receiving device, using the supplemental content stored at that device based on instructions received in metadata with the unmodified camera feed image frames).

Accordingly, in some scenarios, modifying the outgoing camera feed and transmitting the modified outgoing camera feed may include sending the outgoing camera feed 221, the supplemental content, and instructions for rendering the outgoing camera feed and the supplemental content to the remote device. In some scenarios modifying the outgoing camera feed and transmitting the modified outgoing camera feed may include sending the outgoing camera feed and instructions for obtaining and rendering the supplemental content the remote device.

For example, as shown in FIG. 7, when the content merging engine 406 of the messaging application of the sending electronic device (e.g., electronic device 115) receives the camera feed 221 including a series of image frames from the camera 201 and receives static supplemental content 400, animated supplemental content 402, and/or adaptive supplemental content 404 as selected by the user of the device, instead of integrating the supplemental content into the pixel values of the image frames and providing the modified pixel values to encoder 610 for encoding and transmission, the content merging engine 406 may send only the image frames (camera feed) to the encoder 610 while supplemental content metadata and/or AR metadata is provided directly to packaging engine 511.

As shown in FIG. 7, the packaging engine 511 may receive the encoded camera feed from the encoder 610 and package the encoded camera feed, the supplemental content metadata, and/or the AR metadata for transmission to packaging engine 512. Packaging 512 separates (unpacks) the supplemental content metadata and/or the AR metadata from the encoded camera feed, provides the supplemental content metadata and/or the AR metadata to the messaging application 414, and provides the encoded camera feed to the decoder 613. The decoder 613 decodes the camera feed and provides the incoming camera feed to the messaging application 414.

When the messaging application 414 receives the supplemental content metadata, the AR metadata, and the decoded incoming camera feed, the messaging application 414 modifies the incoming camera feed based on the supplemental content metadata for display as incoming supplemented image 300 in the message stream view 302 of messaging application 414 of the remote device. For example, the messaging application 414 of the remote device may obtain the supplemental content from the supplemental content metadata itself, or from local storage at the remote device or cloud-based storage based on instructions in the supplemental content metadata. The messaging application 414 may then modify each of the series of image frames of the camera feed by addition of the obtained supplemental content 223 (e.g., by adding supplemental content values to some or all of the pixel values of the image frames and/or replacing some or all of the pixel values of the image frames with supplemental content values) for display.

In these non-integrated transmission scenarios, the supplemental content from the sending device can be modified or removed from the camera feed at the remote device and/or additional remote supplemental content 230 can be added to the supplemented camera feed at the receiving device.

The examples described above in connection with FIGS. 6 and 7 illustrate transmission of a modified or supplemented camera feed to one remote device. However, it should be appreciated that the modified or supplemented camera feed can be provided to multiple remote devices for viewing and/or editing in a group messaging conversation between more than two devices.

Figure 8:
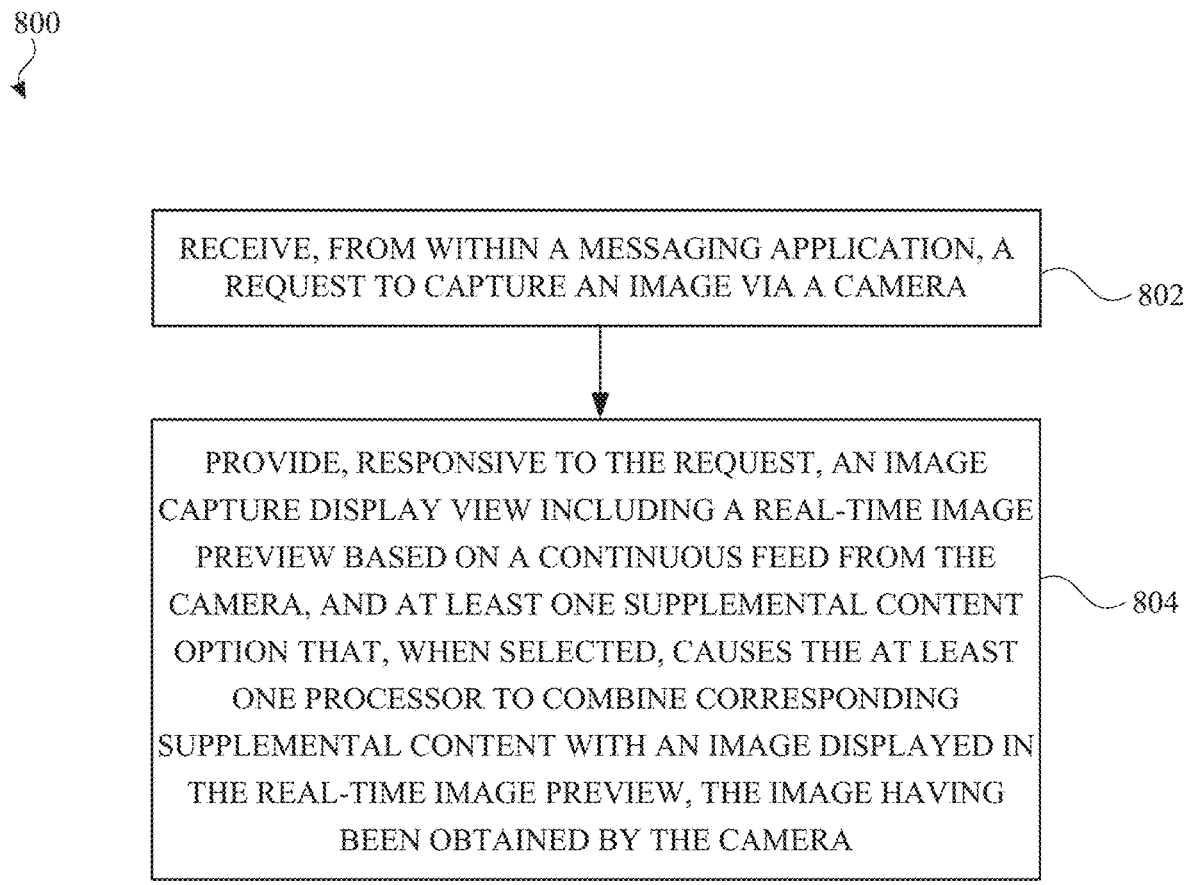
FIG. 8 illustrates a flow diagram of an example process for modifying images with supplemental content for messaging in accordance with one or more implementations.

FIG. 8 illustrates a flow diagram of an example process 800 for modifying images with supplemental content for messaging in accordance with one or more implementations. For explanatory purposes, the process 800 is primarily described herein with reference to the components of FIGS. 1 and 2 (particularly with reference to electronic device 115), which may be executed by one or more processors of the electronic device 115 of FIGS. 1 and 2. However, the process 800 is not limited to the electronic device 115, and one or more blocks (or operations) of the process 800 may be performed by one or more other components of other suitable devices, such as one or more of the electronic device 110 or the server 120. Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

At block 802, a processor of electronic device 115 receives, from within a messaging application running on electronic device 115, a request to capture an image via camera 201.

At block 804, the processor of electronic device 115 provides, responsive to the request, an image capture display view 211. The image capture display view 211 includes a real-time image preview 220 based on a continuous feed from the camera. The image capture display view also includes at least one supplemental content option 222 that, when selected, causes the processor to combine corresponding supplemental content (e.g., corresponding to the selected supplemental content option 222) with an image displayed in the real-time image preview 220, the image having been obtained by the camera 201. The image may be one or a camera feed 221 of images from camera 201 that are provided as a real-time image preview 220 with which the user of electronic device 115 can observe the image to be captured when an image capture option 224 is selected.

Figure 9:
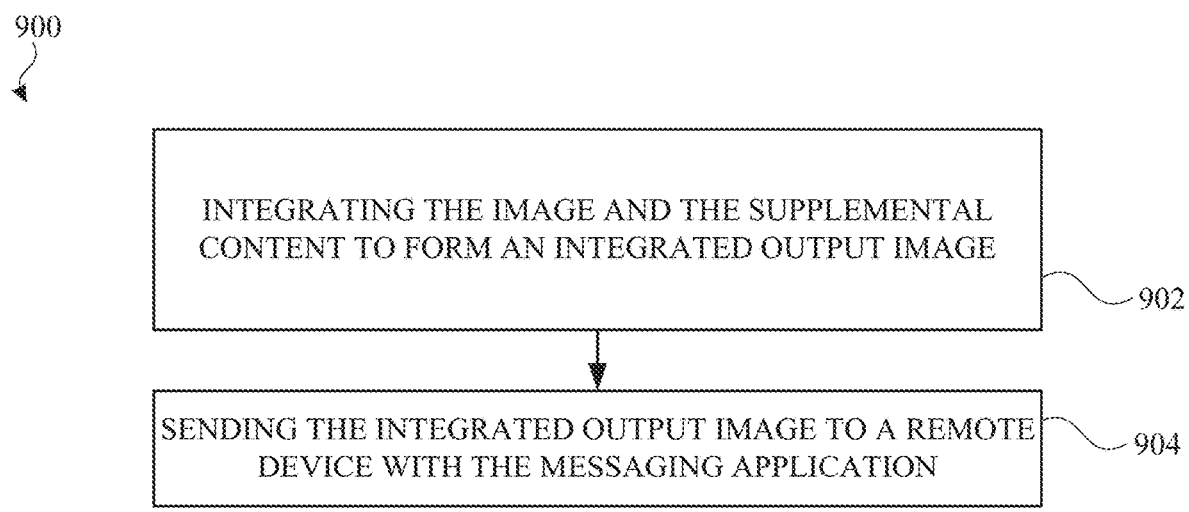
FIG. 9 illustrates a flow diagram of an example process for sending a message including a captured image with supplemental content in accordance with one or more implementations.

FIG. 9 illustrates a flow diagram of an example process 900 for sending an image modified with supplemental content in accordance with one or more implementations. For explanatory purposes, the process 900 is primarily described herein with reference to the components of FIGS. 1 and 2 (particularly with reference to electronic device 115), which may be executed by one or more processors of the electronic device 115 of FIGS. 1 and 2. However, the process 900 is not limited to the electronic device 115, and one or more blocks (or operations) of the process 900 may be performed by one or more other components of other suitable devices, such as one or more of the electronic device 110 or the server 120. Further for explanatory purposes, the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

At block 902, a still image such as captured image 229 of FIG. 2 that has been captured by camera 201 is integrated with supplemental content 223 within a messaging application by changing or replacing one or more pixel values of captured image 229 to form an output image (e.g., an integrated modified image). The integrated modified image may include pixel values representing the modified image as displayed to the user, including the supplemental content that was added by the user, without storing information about the modification.

At block 904, the processor of electronic device 115 sends the output image to a remote device such as another electronic device 115 or electronic device 110, Sending the output image may include provide the output image from the messaging application to communications circuitry and/or network interfaces of the device for transmission (e.g., over network 106). In this example, the output image is sent without any metadata that describes the supplemental content as separate from the captured image.

When the remote device receives the output image, the output image may be displayed in a message stream (e.g., a stream of incoming and outgoing messages of a messaging session or conversation, displayed in a message stream view by a messaging application running on the remote device). Because the output image was integrated with the supplemental content, at block 902, prior to sending, the remote device displays the received integrated output image without modification.

However, as noted herein, in some scenarios, it may be desirable to send a modified image with supplemental content by providing an unmodified captured image along with instructions to modify the image with the supplemental content at the receiving device. In this way, a receiving user can be provided with the ability to identify modifications that have been made, undo the modifications and/or further modify the image with the receiving device. In this way, the amount of data to be transferred can also be reduced (e.g., if the supplemental content is stored on both devices and rendered at the receiving device using the supplemental content stored at that device based on instructions received in metadata with the unmodified captured image).

FIG. 10 illustrates a flow diagram of another example process 1000 for sending an image modified with supplemental content in accordance with one or more implementations. For explanatory purposes, the process 1000 is primarily described herein with reference to components of the components of FIGS. 1 and 2 (particularly with reference to electronic device 115), which may be executed by one or more processors of the electronic device 115 of FIGS. 1 and 2. However, the process 1000 is not limited to the electronic device 115, and one or more blocks (or operations) of the process 1000 may be performed by one or more other components of other suitable devices, such as one or more of the electronic device 110 or the server 120. Further for explanatory purposes, the blocks of the process 1000 are described herein as occurring in serial, or linearly. However, multiple blocks of the process 1000 may occur in parallel. In addition, the blocks of the process 1000 need not be performed in the order shown and/or one or more blocks of the process 1000 need not be performed and/or can be replaced by other operations.

At block 1002, the processor of electronic device 115 provides, with the messaging application, the image (e.g., the unmodified image that has been captured by camera 201 of electronic device 115) and instructions for modifying the image with the supplemental content.

At block 1004, the processor of electronic device 115 operates a network interface of the device to send to the remote device, the image, the instructions for modifying the image with the supplemental content, and/or the supplemental content itself. For example, the image may be sent with metadata that includes instructions for modifying the image with the supplemental content that is provided as a part of the message. As another example, the image may be sent with metadata that includes instructions for obtaining the supplemental content (e.g., from local storage of the receiving device or from cloud-based storage such as storage of server 120) and for modifying the image with the obtained supplemental content. In one operational scenario, the supplemental content metadata includes instructions for the remote device to obtain a file corresponding to an animated emoji such as a dancing happy face (e.g., from local storage at the receiving device or from a cloud location specified in the supplemental content metadata) and to add the animation to the image that accompanied the supplemental content metadata in the message. In this operational scenario, the receiving user would see the image with the dancing happy facing animated over the image and be able to select, move, modify, remove, or replace the dancing happy face in the image. Similar operations can be performed for static supplemental content such as stickers or for adaptive supplemental content that adapts to the features of the image content.

Figure 11:
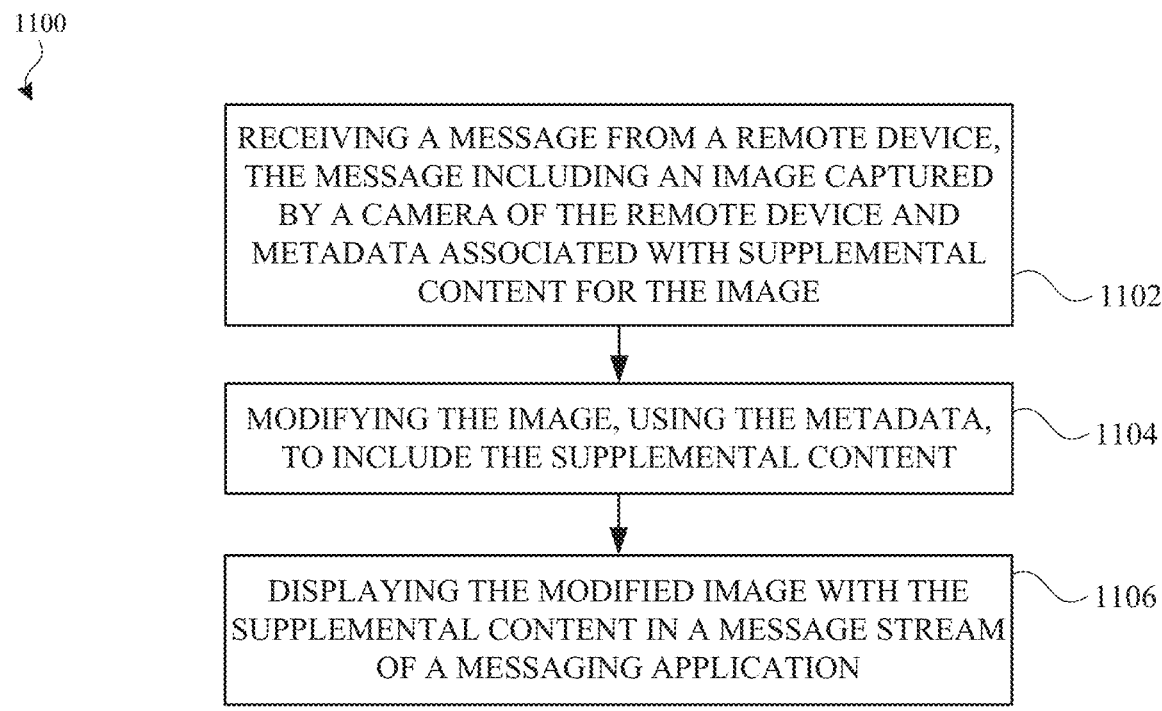
FIG. 11 illustrates a flow diagram of an example process for displaying images modified with supplemental content in a message stream in accordance with one or more implementations.

FIG. 11 illustrates a flow diagram of an example process 1100 for receiving and displaying a message including an image modified with supplemental content (e.g., an image provided with supplemental content as described in block 1004 of FIG. 10) in accordance with one or more implementations. For explanatory purposes, the process 1100 is primarily described herein with reference to components of the components of FIGS. 1 and 2 (particularly with reference to electronic device 110), which may be executed by one or more processors of the electronic device 110 of FIGS. 1 and 2. However, the process 1100 is not limited to the electronic device 110, and one or more blocks (or operations) of the process 1100 may be performed by one or more other components of other suitable devices, such as one or more of the electronic device 115 or the server 120. Further for explanatory purposes, the blocks of the process 1100 are described herein as occurring in serial, or linearly. However, multiple blocks of the process 1100 may occur in parallel. In addition, the blocks of the process 1100 need not be performed in the order shown and/or one or more blocks of the process 1100 need not be performed and/or can be replaced by other operations.

At block 1102, a receiving device such as electronic device 110 receives a message from a remote device (e.g., electronic device 115), the message including an image captured by a camera of the remote device and metadata associated with supplemental content for the image (e.g., in an incoming supplemented image 300 as shown in FIG. 3). The metadata includes instructions for modifying the image for display in a messaging application (e.g., messaging application 414) of the receiving device. In some scenarios, the metadata may also include the supplemental content (e.g., supplemental content 223 such as a digital sticker or an animated image to be overlaid or replace pixels at a particular location on the image, or other content to be rendered over or in place of portions of the image based on the image content). For example, the metadata may include an animal face to be displayed over a face in the image and having an expression determined by the expression on the face. In some scenarios, the metadata includes instructions for obtaining the supplemental content (e.g., instructions to retrieve the supplemental content from local storage at the device or from remote storage), and instructions for modifying the image using the obtained supplemental content.

At block 1104, the processor of the receiving device modifies the image, using the metadata, to include the supplemental content. Modifying the image may include obtaining the supplemental content based on instructions in the metadata of the message or from the message itself and modifying the image based on modification instructions in the metadata.

At block 1106, the processor of the receiving device displays the modified image with the supplemental content as incoming supplemented image 300 in a message stream view 302 (e.g., an active messaging thread) of a messaging application. The receiving device may also provide the receiving user with the ability to undo, modify, or further supplement the incoming supplemented image (e.g., as described above in connection with FIG. 3).

Figure 12:
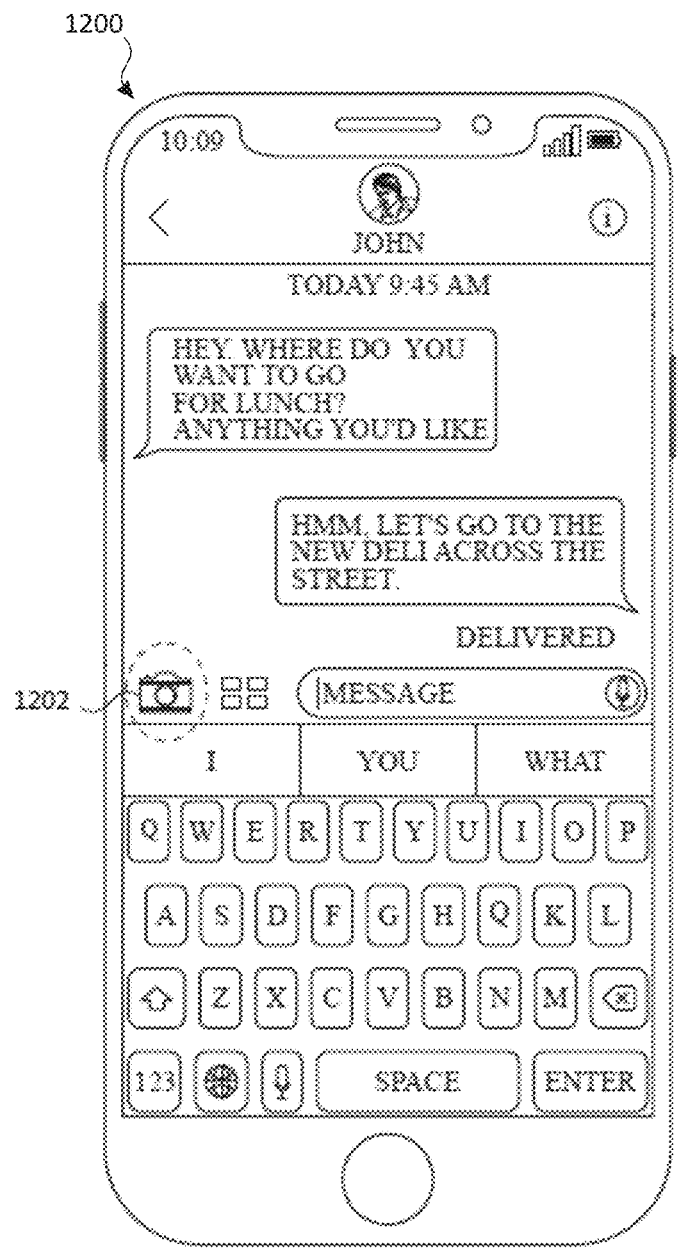
FIG. 12 illustrates an example user interface of a selection of a camera mode option in a messaging application in accordance with one or more implementations.
Figure 13:
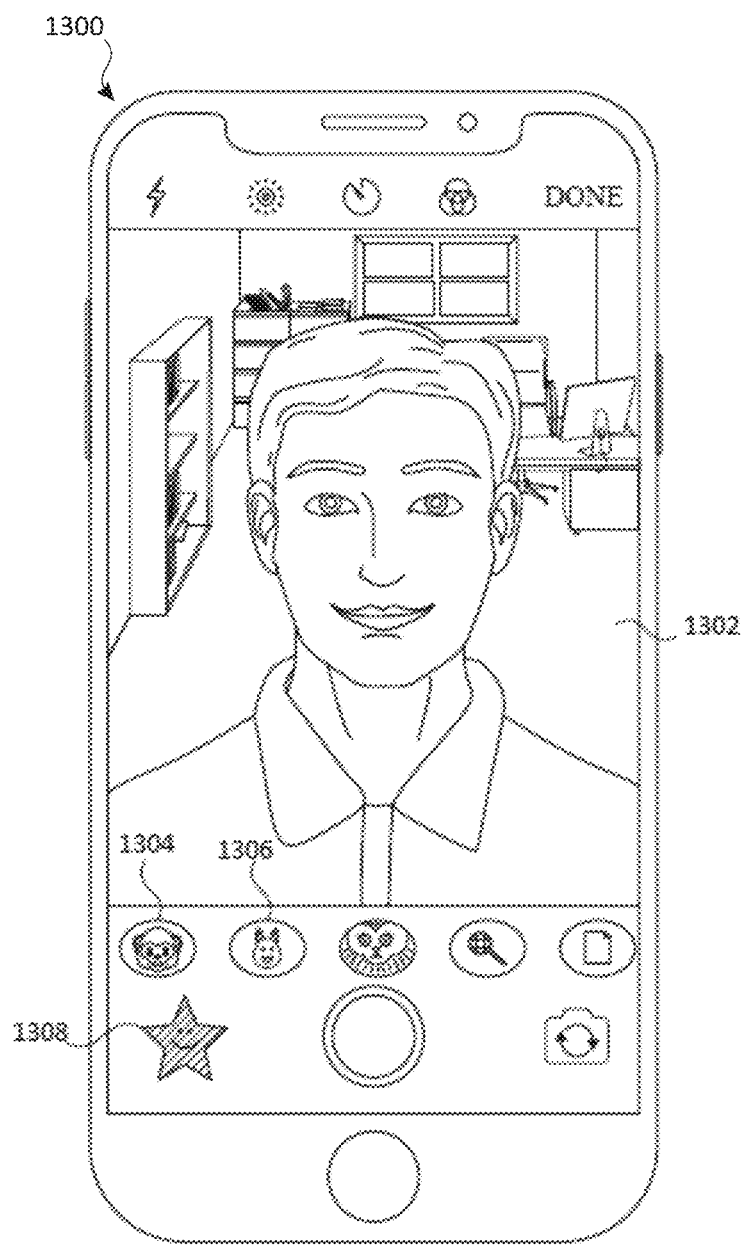
FIG. 13 illustrates an example user interface of a camera feed displayed with supplemental content options after selection of a camera mode option in accordance with one or more implementations.
Figure 14:
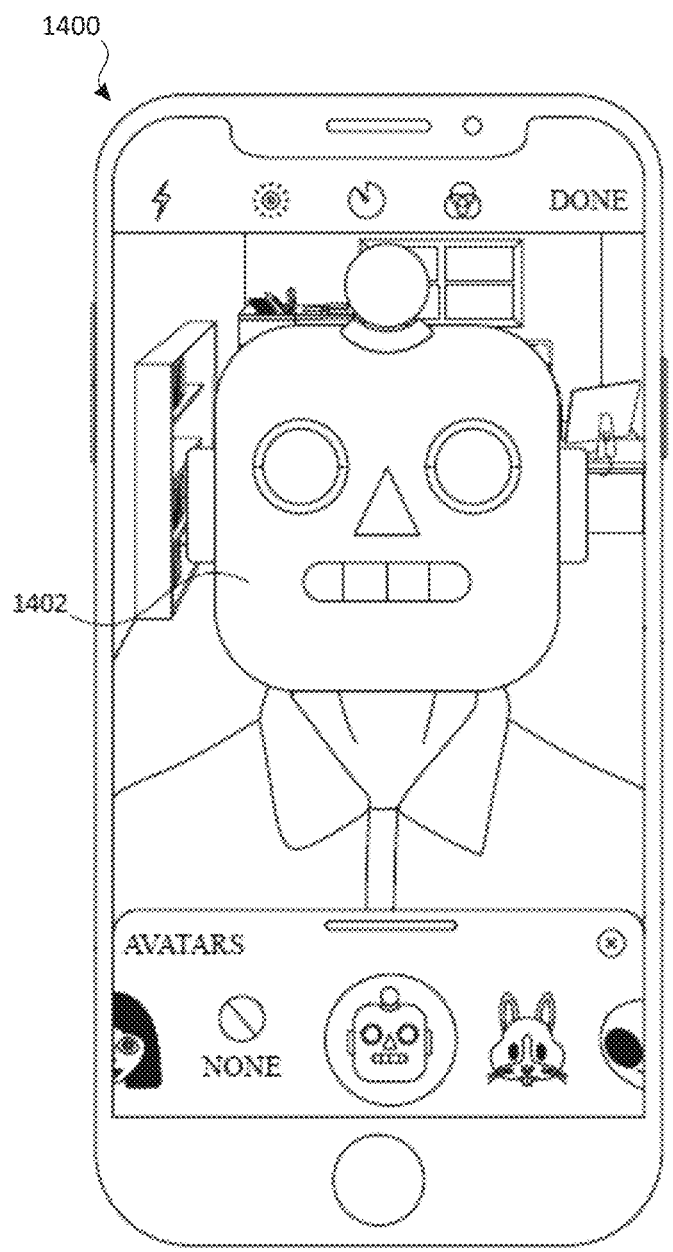
FIG. 14 illustrates an example user interface of supplemental content added to a camera feed in accordance with one or more implementations.
Figure 15:
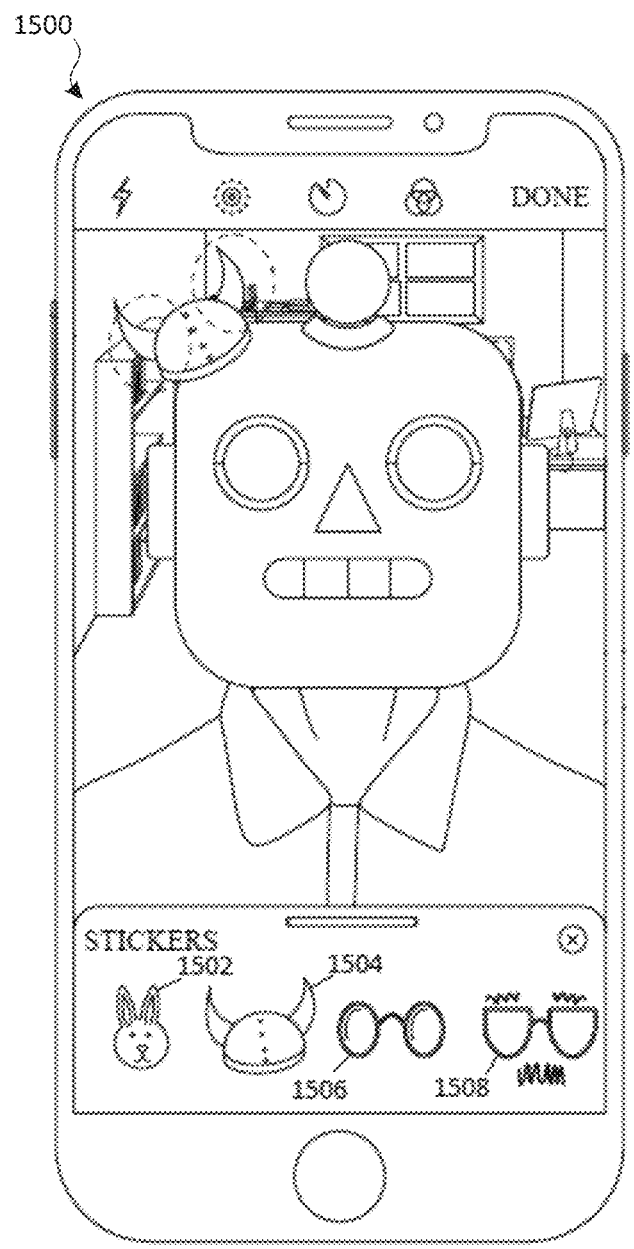
FIG. 15 illustrates an example user interface of stickers that can be added to a camera feed in accordance with one or more implementations.

The user interfaces described herein (see, e.g., FIGS. 2 and 3) may utilize one or more elements (or the entirety) of one or more of the user interfaces illustrated in FIGS. 12-15. For example, the user interface 1200 of FIG. 12 illustrates a selection of the camera mode option 208 or the camera mode option 308 (see, e.g., element 1202 of FIG. 12) in a messaging application. As another example, the user interface 1300 of FIG. 13 illustrates a camera feed 221 (see, e.g., element 1302 of FIG. 13) displayed with supplemental content options (see, e.g., elements 1304, 1306 and 1308 of FIG. 13) after selection of the camera mode option. As another example, the user interface 1400 of FIG. 14 may illustrate supplemental content 223 (see, e.g., adaptive supplemental content such as a robot head 1402 of FIG. 14) added to the camera feed. As another example, the user interface 1500 of FIG. 15 may illustrate stickers (see, e.g., static supplemental content stickers 1502, 1504, 1506 and 1508 of FIG. 15) that can be added to a camera feed (or captured image) with (or without) the added adaptive supplemental content. In one aspect of the disclosure, the elements recited in FIGS. 12-15 may be presented by one or more of electronic device 115, electronic device 110, and/or server 120. FIGS. 12-15 may present elements of various steps, operations or processes in a sample order, and are not meant to be limited to the specific order or hierarchy presented.

Figure 16:
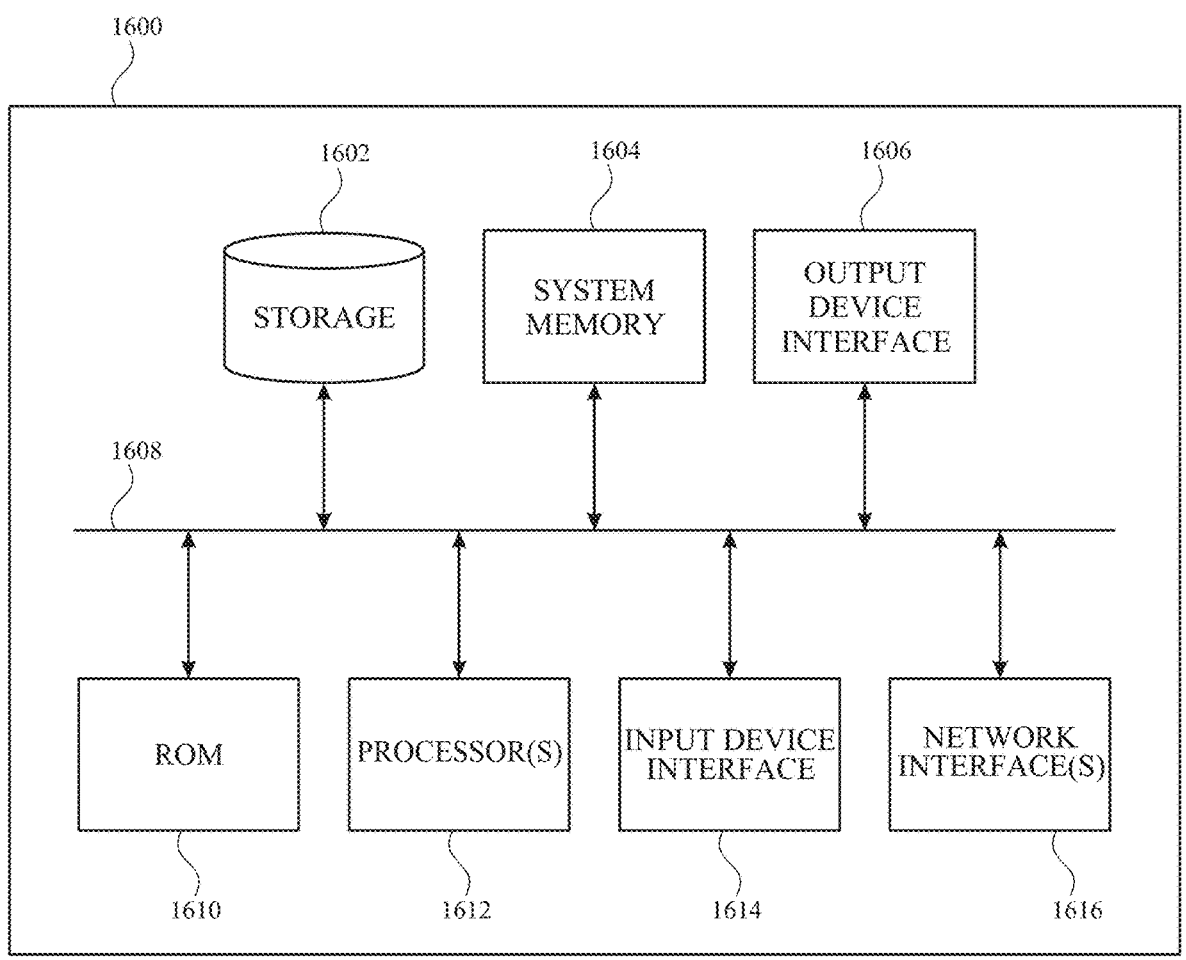
FIG. 16 illustrates an electronic system with which one or more implementations of the subject technology may be implemented.

FIG. 16 illustrates an electronic system 1600 with which one or more implementations of the subject technology may be implemented. The electronic system 1600 can be, and/or can be a part of, the electronic device 110, the electronic device 115, and/or the server 160 shown in FIG. 1. The electronic system 1600 may include various types of computer readable media and interfaces for various other types of computer readable media. The electronic system 1600 includes a bus 1608, one or more processing unit(s) 1612, a system memory 1604 (and/or buffer), a ROM 1610, a permanent storage device 1602, an input device interface 1614, an output device interface 1606, and one or more network interfaces 1616, or subsets and variations thereof.

The bus 1608 collectively represents all system, peripheral, and chipset buses that communicatively connect the numerous internal devices of the electronic system 1600. In one or more implementations, the bus 1608 communicatively connects the one or more processing unit(s) 1612 with the ROM 1610, the system memory 1604, and the permanent storage device 1602. From these various memory units, the one or more processing unit(s) 1612 retrieves instructions to execute and data to process in order to execute the processes of the subject disclosure. The one or more processing unit(s) 1612 can be a single processor or a multi-core processor in different implementations.

The ROM 1610 stores static data and instructions that are needed by the one or more processing unit(s) 1612 and other modules of the electronic system 1600. The permanent storage device 1602, on the other hand, may be a read-and-write memory device. The permanent storage device 1602 may be a non-volatile memory unit that stores instructions and data even when the electronic system 1600 is off. In one or more implementations, a mass-storage device (such as a magnetic or optical disk and its corresponding disk drive) may be used as the permanent storage device 1602.

In one or more implementations, a removable storage device (such as a floppy disk, flash drive, and its corresponding disk drive) may be used as the permanent storage device 1602. Like the permanent storage device 1602, the system memory 1604 may be a read-and-write memory device. However, unlike the permanent storage device 1602, the system memory 1604 may be a volatile read-and-write memory, such as random access memory. The system memory 1604 may store any of the instructions and data that one or more processing unit(s) 1612 may need at runtime. In one or more implementations, the processes of the subject disclosure are stored in the system memory 1604, the permanent storage device 1602, and/or the ROM 1610. From these various memory units, the one or more processing unit(s) 1612 retrieves instructions to execute and data to process in order to execute the processes of one or more implementations.

The bus 1608 also connects to the input and output device interfaces 1614 and 1606. The input device interface 1614 enables a user to communicate information and select commands to the electronic system 1600. Input devices that may be used with the input device interface 1614 may include, for example, alphanumeric keyboards and pointing devices (also called "cursor control devices"). The output device interface 1606 may enable, for example, the display of images generated by electronic system 1600. Output devices that may be used with the output device interface 1606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 16, the bus 1608 also couples the electronic system 1600 to one or more networks and/or to one or more network nodes, such as the electronic device 115 shown in FIG. 1, through the one or more network interface(s) 1616. In this manner, the electronic system 1600 can be a part of a network of computers (such as a LAN, a wide area network ("WAN"), or an Intranet, or a network of networks, such as the Internet. Any or all components of the electronic system 1600 can be used in conjunction with the subject disclosure.

In accordance with various aspects of the subject disclosure, a device is provided that includes at least one processor configured to receive, from within a messaging application, a request to capture an image via a camera and provide, responsive to the request, an image capture display view. The image capture display view includes a real-time image preview based on a continuous feed from the camera. The image capture display view includes also includes at least one supplemental content option that, when selected, causes the at least one processor to combine corresponding supplemental content with an image displayed in the real-time image preview, the image having been obtained by the camera.

In accordance with various aspects of the subject disclosure, a method is provided that includes receiving, from within a messaging application, a request to capture an image via a camera. The method also includes providing, responsive to the request, an image capture display view.

The image capture display view includes a real-time image preview based on a continuous feed from the camera and at least one supplemental content option that, when selected, combines corresponding supplemental content with an image displayed in the real-time image preview, the image having been obtained by the camera.

In accordance with various aspects of the subject disclosure, non-transitory computer-readable medium is provided that includes instructions, which when executed by at least one computing device, cause the at least one computing device to perform operations including receiving a message from a remote device, the message including an image captured by a camera of the remote device and metadata associated with supplemental content for the image. The operations also include modifying the image, using the metadata, to include the supplemental content. The operations also include displaying the modified image with the supplemental content in a message stream of a messaging application.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the turns "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the phrase "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
a memory; and
at least one processor communicatively coupled to the memory and configured to:
receive, from within a messaging application, a request to capture an image via a camera; and
provide, responsive to the request, an image capture display view including a real-time image preview based on a continuous feed from the camera;
provide at least one supplemental content option that, when selected, causes the at least one processor to obtain depth information from a sensor of the device and combine corresponding supplemental content with an image displayed in the real-time image preview using the depth information, the image having been obtained by the camera; and
provide a send option that, when selected, causes the at least one processor to:
send a package that includes the image and metadata, the metadata including supplemental content metadata that includes instructions for obtaining the supplemental content and augmented-reality metadata that includes a location of at least one feature of a user in the image and at least a portion of the depth information, to a recipient with the messaging application for rendering of the image combined with the supplemental content at a remote device of the recipient using the instructions and the augmented-reality metadata; and
display the image combined with the supplemental content in a message stream view of the messaging application.

2. The device of claim 1, wherein the supplemental content option is provided together with the continuous feed from the camera, and wherein a selection of the supplemental content option causes the at least one processor to add the supplemental content to the continuous feed from the camera.

3. The device of claim 2, wherein the supplemental content includes static supplemental content that is displayed over the continuous feed from the camera.

4. The device of claim 2, wherein the supplemental content includes animated supplemental content that is displayed over the continuous feed from the camera.

5. The device of claim 2, wherein the supplemental content includes adaptive supplemental content that is displayed over the continuous feed from the camera, and wherein the at least one processor is configured to modify the adaptive supplemental content based on content in the continuous feed from the camera.

6. The device of claim 5, wherein the adaptive supplemental content comprises facial modification content, and wherein the at least one processor is configured to:
detect a face in the continuous feed from the camera;
apply the facial modification content to the detected face; and
actively modify the facial modification content based on changes to the detected face.

7. The device of claim 2, wherein the at least one processor is further configured to:
receive, at a time, a selection of an image capture option while displaying the supplemental content and the continuous feed from the camera;
operate the camera to capture a still image responsive to the selection of the image capture option; and
display the still image with the supplemental content as displayed at the time of the selection of the image capture option.

8. The device of claim 1, wherein the at least one processor is further configured to:
provide the send option within the image capture display view, wherein the message stream view displays an active messaging thread.

9. The device of claim 8, wherein the at least one processor is configured to send an additional image combined with additional corresponding supplemental content to the remote device by:
integrating the additional image and the additional supplemental content to form an integrated output image; and
sending the integrated output image to the remote device.

10. The device of claim 8, wherein the at least one processor is further configured to send instructions for rendering the image and the supplemental content to the remote device.

11. The device of claim 8, wherein the at least one processor is configured to:
reduce a resolution of a portion of the image to be covered with the supplemental content without reducing a resolution of other portions of the image; and
send the image with the reduced resolution portion in the package to the remote device.

12. The device of claim 8, wherein the at least one processor is further configured to:
receive an incoming message from the remote device, the incoming message including the image and further supplemental content for the image; and
display, in the message stream view, the image and the further supplemental content.

13. The device of claim 8, wherein the at least one processor is further configured to:
receive an incoming message from the remote device, the incoming message including the image and metadata associated with further supplemental content for the image;
obtain the further supplemental content from local storage or cloud-based storage, based on the metadata; and
display, in the message stream view, the image, the supplemental content, and the further supplemental content.

14. A method, comprising:
receiving, from within a messaging application, a request to capture an image via a camera; and
providing, responsive to the request, an image capture display view including a real-time image preview based on a continuous feed from the camera;
providing at least one supplemental content option that, when selected, obtains depth information from a sensor and combines corresponding supplemental content with an image displayed in the real-time image preview using the depth information, the image having been obtained by the camera; and
providing a send option that, when selected, causes the messaging application to:
send a package that includes the image and metadata, the metadata including supplemental content metadata that includes instructions for obtaining the supplemental content and including augmented-reality metadata that includes a location of at least one feature of a user in the image and at least a portion of the depth information, to a recipient for rendering of the image combined with the supplemental content at a remote device of the recipient using the instructions and the augmented-reality metadata; and
display the image combined with the supplemental content in a message stream view of the messaging application.

15. The method of claim 14, further comprising:
receiving a selection of an image capture option;
capturing a still image using the camera; and
providing the supplemental content option together with the still image in the real-time image preview.

16. The method of claim 15, further comprising adding, responsive to a selection of the supplemental content option, static or animated supplemental content to the still image.

17. A non-transitory computer-readable medium comprising instructions, which when executed by at least one computing device, cause the at least one computing device to perform operations comprising:
receiving, from within a messaging application, a request to capture an image via a camera;
providing, responsive to the request, an image capture display view including a real-time image preview based on a continuous feed from the camera;
providing at least one supplemental content option that, when selected, causes the at least one computing device to obtain depth information from a sensor and combine corresponding supplemental content with an image displayed in the real-time image preview using the depth information, the image having been obtained by the camera; and
providing a send option that, when selected, causes the messaging application to:
send a package that includes the image and metadata, the metadata including supplemental content metadata that includes instructions for obtaining the supplemental content and augmented-reality metadata that includes a location of at least one feature of a user in the image and at least a portion of the depth information, to a recipient with the messaging application for rendering of the image combined with the supplemental content at a remote device of the recipient using the instructions and the augmented-reality metadata; and
display the image combined with the supplemental content in a message stream view of the messaging application.

18. The non-transitory computer-readable medium of claim 17, wherein, the augmented-reality metadata includes instructions for modifying the image to include the supplemental content.

* * * * *